US011407472B2

(12) United States Patent
Shahana et al.

(10) Patent No.: US 11,407,472 B2
(45) Date of Patent: Aug. 9, 2022

(54) HUMAN-POWERED VEHICLE CONTROL DEVICE

(71) Applicant: Shimano Inc., Osaka (JP)

(72) Inventors: Satoshi Shahana, Osaka (JP); Hitoshi Takayama, Osaka (JP); Yasuho Hommoto, Osaka (JP)

(73) Assignee: Shimano Inc., Osaka (JP)

( * ) Notice: Subject to any disclaimer, the term of this patent is extended or adjusted under 35 U.S.C. 154(b) by 196 days.

(21) Appl. No.: 16/232,443

(22) Filed: Dec. 26, 2018

(65) Prior Publication Data

US 2019/0202525 A1   Jul. 4, 2019

(30) Foreign Application Priority Data

Dec. 28, 2017  (JP) .............................. JP2017-253405

(51) Int. Cl.
  *B62M 6/45* (2010.01)
  *B62M 6/50* (2010.01)
  *B60L 15/20* (2006.01)
  *B60L 50/20* (2019.01)

(52) U.S. Cl.
  CPC .............. *B62M 6/45* (2013.01); *B60L 15/20* (2013.01); *B60L 50/20* (2019.02); *B62M 6/50* (2013.01); *B60L 2200/12* (2013.01); *B60L 2240/461* (2013.01); *B60L 2240/486* (2013.01); *B60L 2250/18* (2013.01)

(58) Field of Classification Search
  None
  See application file for complete search history.

(56) References Cited

U.S. PATENT DOCUMENTS

| | | | | |
|---|---|---|---|---|
| 5,199,929 A | * | 4/1993 | Stites ....................... | B62M 9/04 474/54 |
| 5,599,244 A | * | 2/1997 | Ethington ............... | B62M 9/123 474/81 |
| 6,047,230 A | * | 4/2000 | Spencer ................. | B62M 9/123 474/70 |
| 8,602,149 B2 | * | 12/2013 | Krieger .................... | B62M 6/45 180/206.3 |
| 9,376,163 B2 | * | 6/2016 | Arimune .................. | B62M 6/50 |

(Continued)

FOREIGN PATENT DOCUMENTS

| | | |
|---|---|---|
| DE | 10 2017 111 876 A1 | 12/2017 |
| JP | 2014-69690 A | 4/2014 |
| JP | 2015-110402 A | 6/2015 |

*Primary Examiner* — Khoi H Tran
*Assistant Examiner* — Tristan J Greiner
(74) *Attorney, Agent, or Firm* — Global IP Counselors, LLP

(57) ABSTRACT

A human-powered vehicle control device includes an electronic controller configured to control an electric component of a human-powered vehicle including a crank and a drive wheel. The electronic controller is configured to control the electric component so as to change at least one of a first ratio of a rotational speed of the drive wheel to a rotational speed of the crank and a second ratio of a drive force assisting propulsion of the human-powered vehicle to the human drive force upon determining a human drive force input to the crank shifts from a first range to outside the first range. The electronic controller is configured to change the first range in accordance with at least one of a state of a rider and a running state of the human-powered vehicle.

20 Claims, 9 Drawing Sheets

(56) References Cited

U.S. PATENT DOCUMENTS

| | | | | |
|---|---|---|---|---|
| 9,656,722 | B2* | 5/2017 | Tauchi | ............... B62M 15/00 |
| 2011/0254673 | A1* | 10/2011 | Jean | .................. B62M 6/45 |
| | | | | 340/432 |
| 2015/0019062 | A1* | 1/2015 | Previdi | ............... B62M 6/90 |
| | | | | 180/220 |
| 2015/0120119 | A1* | 4/2015 | Tauchi | ............... B62M 15/00 |
| | | | | 701/22 |
| 2016/0014252 | A1 | 1/2016 | Biderman et al. | |
| 2016/0144928 | A1* | 5/2016 | Chun | .................. B62M 6/45 |
| | | | | 701/22 |
| 2016/0304157 | A1* | 10/2016 | Craven | ............... B62M 6/50 |
| 2017/0334514 | A1* | 11/2017 | Chen | .................. B62M 6/55 |

* cited by examiner

HUMAN-POWERED VEHICLE CONTROL DEVICE

CROSS-REFERENCE TO RELATED APPLICATIONS

This application claims priority to Japanese Patent Application No. 2017-253405, filed on Dec. 28, 2017. The entire disclosure of Japanese Patent Application No. 2017-253405 is hereby incorporated herein by reference.

BACKGROUND

Technical Field

The present disclosure generally relates to a human-powered vehicle control device.

Background Information

Japanese Laid-Open Patent Publication No. 2015-110402 (Patent document 1) describes an example of a human-powered vehicle control device. The human-powered vehicle control device of patent document 1 executes control so that a drive force of the human-powered vehicle and a rotational speed of a crank have a predetermined relationship.

SUMMARY

Although the preferred relationship between the drive force of the human-powered vehicle and the rotational speed of the crank differs in accordance with various conditions, the human-powered vehicle control device does not take this into consideration.

It is an object of the present disclosure to provide a human-powered vehicle control device that obtains a relationship between the human drive force and the rotational speed of the crank that is suitable for a rider.

A human-powered vehicle control device in accordance with a first aspect of the present disclosure comprises an electronic controller configured to control an electric component of a human-powered vehicle including a crank and a drive wheel. The electronic controller is configured to control the electric component so as to change at least one of a first ratio of a rotational speed of the drive wheel to a rotational speed of a crank and a second ratio of a drive force assisting propulsion of the human-powered vehicle to the human drive force upon determining a human drive force input to the crank shifts from a first range to outside the first range. Further, the electronic controller is configured to change the first range in accordance with at least one of a state of a rider and a running state of the human-powered vehicle.

In accordance with the first aspect, the first range is changed in accordance with at least one of the state of the rider and the running state of the human-powered vehicle. Thus, the relationship between the human drive force and the rotational speed of the crank is suitable for the rider.

In accordance with a second aspect of the present disclosure, in the human-powered vehicle control device according to the first aspect, the electronic controller is configured to control the electric component so as to change at least one of the first ratio and the second ratio upon determining the rotational speed of the crank shifts from a second range to outside the second range.

In accordance with the second aspect, at least one of the first ratio and the second ratio is suitable for the rotational speed of the crank.

In accordance with a third aspect of the present disclosure, in the human-powered vehicle control device according to the first or second aspect, the electronic controller is configured to switch between a first control state, in which the electronic controller controls the electric component so as to change at least one of the first ratio and the second ratio upon determining the human drive force shifts from the first range to outside the first range, and a second control state, in which the electronic controller does not change the first ratio and the second ratio even if the human drive force shifts from the first range to outside the first range. Further, the electronic controller is configured to switch between the first control state and the second control state in accordance with at least one of the state of the rider and the running state of the human-powered vehicle.

In accordance with the third aspect, the control state is switched to the one of the first control state and the control state that is suitable for at least one of the state of the rider and the running state of the human-powered vehicle.

In accordance with a fourth aspect of the present disclosure, in the human-powered vehicle control device according to the second aspect, the electronic controller is configured to switch between a first control state, in which the electronic controller controls the electric component so as to change at least one of the first ratio and the second ratio upon determining the human drive force shifts from the first range to outside the first range, and a second control state, in which the electronic controller does not change the first ratio and the second ratio even if the human drive force shifts from the first range to outside the first range. Further, the electronic controller is configured to switch between the first control state and the second control state in accordance with at least one of the state of the rider and the running state of the human-powered vehicle. The electronic controller is configured to control the electric component so as to change at least one of the first ratio and the second ratio upon determining the rotational speed of the crank shifts outside the second range and while in the first control state. The electronic controller is configured not to change the first ratio and the second ratio even when the rotational speed of the crank shifts outside the second range and while in the second control state.

In accordance with the fourth aspect, the control state is switched to the one of the first control state and the second control state that is suitable for at least one of the state of the rider and the running state of the human-powered vehicle.

In accordance with a fifth aspect of the present disclosure, in the human-powered vehicle control device according to the second or fourth aspect, the electronic controller is configured to control the electric component so as to increase the first ratio upon determining the rotational speed of the crank is higher than the second range.

In accordance with the fifth aspect, the first ratio is increased upon determining the rotational speed of the crank is higher than the second range so that the rotational speed of the crank easily shifts into the second range.

In accordance with a sixth aspect of the present disclosure, in the human-powered vehicle control device according to any one of the second, fourth, and fifth aspects, the electronic controller is configured to control the electric component so as to decrease the first ratio upon determining the rotational speed of the crank is lower than the second range.

In accordance with the sixth aspect, the first ratio is decreased upon determining the rotational speed of the crank is lower than the second range so that the rotational speed of the crank easily shifts into the second range.

In accordance with a seventh aspect of the present disclosure, in the human-powered vehicle control device according to any one of the second and fourth to sixth aspects, the electronic controller is configured to control the electric component so as to increase the second ratio upon determining the rotational speed of the crank is higher than the second range.

In accordance with the seventh aspect, the second ratio is increased upon determining the rotational speed of the crank is higher than the second range. This increases the drive force assisting propulsion of the human-powered vehicle and allows for easy acceleration of the human-powered vehicle.

In accordance with an eighth aspect of the present disclosure, in the human-powered vehicle control device according to any one of the second and fourth to seventh aspects, the electronic controller is configured to control the electric component so as to decrease the second ratio upon determining the rotational speed of the crank is lower than the second range.

In accordance with the eighth aspect, the second ratio is decreased upon determining the rotational speed of the crank is lower than the second range. This decrease the drive force assisting propulsion of the human-powered vehicle and allows for easy deceleration of the human-powered vehicle.

A human-powered vehicle control device in accordance with a ninth aspect of the present disclosure comprises an electronic controller configured to control an electric component of a human-powered vehicle including a crank and a drive wheel. The electronic controller is configured to switch between a first control state, in which the electronic controller controls the electric component so as to change at least one of a first ratio of a rotational speed of the drive wheel to a rotational speed of the crank and a second ratio of a drive force assisting propulsion of the human-powered vehicle to the human drive force upon determining the human drive force input to the crank shifts from a first range to outside the first range, and a second control state, in which the electronic controller does not change the first ratio and the second ratio even if the human drive force shifts from the first range to outside the first range. Further, the electronic controller is configured to switch between the first control state and the second control state in accordance with at least one of a state of a rider and a running state of the human-powered vehicle.

In accordance with the ninth aspect, the control state is switched to the one of the first control state and the second control state that is suitable for the state of the rider and the running state of the human-powered vehicle.

In accordance with a tenth aspect of the present disclosure, the human-powered vehicle control device according to any one of the first to ninth aspects is configured so that the electronic controller is configured to control the electric component so as to decrease the first ratio upon determining the human drive force is higher than the first range.

In accordance with the tenth aspect, the load for rotating the crankshaft of the rider is reduced by decreasing the first ratio upon determining the human drive force is higher than the first range. This easily shifts the human drive force into the first range.

In accordance with an eleventh aspect of the present disclosure, in the human-powered vehicle control device according to any one of the first to tenth aspects, the electronic controller is configured to control the electric component so as to increase the first ratio upon determining the human drive force is lower than the first range.

In accordance with the eleventh aspect, the load for rotating the crankshaft of the rider is increased by increasing the first ratio upon determining the human drive force is lower than the first range. This easily shifts the human drive force into the first range.

In accordance with a twelfth aspect of the present disclosure, in the human-powered vehicle control device according to any one of the first to eleventh aspects, the electronic controller is configured to control the electric component so as to increase the second ratio upon determining the human drive force is higher than the first range.

In accordance with the twelfth aspect, the drive force that assists the propulsion of the human-powered vehicle is increased by increasing the second ratio upon determining the human drive force is higher than the first range. This easily shifts the human drive force into the first range.

In accordance with a thirteenth aspect of the present disclosure, in the human-powered vehicle control device according to any one of the first to twelfth aspects, the electronic controller is configured to control the electric component so as to decrease the second ratio upon determining the human drive force is lower than the first range.

In accordance with the thirteenth aspect, the drive force that assists the propulsion of the human-powered vehicle is reduced by decreasing the second ratio upon determining the human drive force is higher than the first range. This easily shifts the human drive force into the first range.

In accordance with a fourteenth aspect of the present disclosure, in the human-powered vehicle control device according to any one of the first to thirteenth aspects, the electronic controller is configured to change the first range by selecting one of a plurality of ranges that at least partially differ from one another as the first range.

In accordance with the fourteenth aspect, the first range can be easily changed by selecting the first range from a plurality of ranges.

In accordance with a fifteenth aspect of the present disclosure, the human-powered vehicle control device according to the fourteenth aspect further comprises an operation part for changing the first range.

In accordance with the fifteenth aspect, the rider can change the first range with the operation part.

In accordance with the sixteenth aspect, the relationship between the human drive force and the rotational speed of the crank is in accordance with at least one of the posture of the rider and the biological information of the rider and suitable for the rider.

In accordance with a seventeenth aspect of the present disclosure, the human-powered vehicle control device according to any one of the first to sixteenth aspects further comprises a first detector configured to detect a state of the rider.

In accordance with the seventeenth aspect, the state of the rider is detected in a preferred manner by the first detector.

In accordance with an eighteenth aspect of the present disclosure, the human-powered vehicle control device according to any one of the first to seventeenth aspects is configured so that the running state of the human-powered vehicle includes at least one of an inclination of the human-powered vehicle, a gradient of a road surface on which the human-powered vehicle travels, and a condition of a road surface on which the human-powered vehicle travels.

In accordance with the eighteenth aspect, the relationship between the human drive force and the rotational speed of the crank is in accordance with at least one of the inclination of the human-powered vehicle, the gradient of the road surface on which the human-powered vehicle travels, and the condition of the road surface on which the human-powered vehicle travels and thus suitable for the rider.

In accordance with a nineteenth aspect of the present disclosure, the human-powered vehicle control device according to any one of the first to eighteenth aspects further comprises a second detector configured to detect a running state of the human-powered vehicle.

In accordance with the nineteenth aspect, the running state of the human-powered vehicle is detected in a preferred manner by the second detector.

In accordance with a twentieth aspect of the present disclosure, the human-powered vehicle control device according to any one of the first to nineteenth aspects further comprises a storage configured to store the first range.

In accordance with the twentieth aspect, the first range can be stored by the storage.

In accordance with a twenty-first aspect of the present disclosure, in the human-powered vehicle control device according to any one of the first to twentieth aspects, the electric component includes a transmission configured to change the first ratio.

In accordance with the twenty-first aspect, the transmission is controlled in accordance with at least one of the conditions of the road surface on which the human-powered vehicle travels so that the relationship between the human drive force and the rotational speed of the crank is suitable for the rider.

In accordance with a twenty-second aspect of the present disclosure, the human-powered vehicle control device according to any one of the first to twenty-first aspects is configured so that the electric component includes a motor assisting propulsion of the human-powered vehicle.

In accordance with the twenty-second aspect, the motor is controlled in accordance with at least one of the conditions of the road surface on which the human-powered vehicle travels so that the relationship between the human drive force and the rotational speed of the crank is suitable for the rider.

The human-powered vehicle control device in accordance with the present disclosure obtains a relationship between the human drive force and the rotational speed of the crank that is suitable for the rider.

BRIEF DESCRIPTION OF THE DRAWINGS

Referring now to the attached drawings which form a part of this original disclosure.

DETAILED DESCRIPTION OF EMBODIMENTS DISCLOSURE

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

Figure 1:
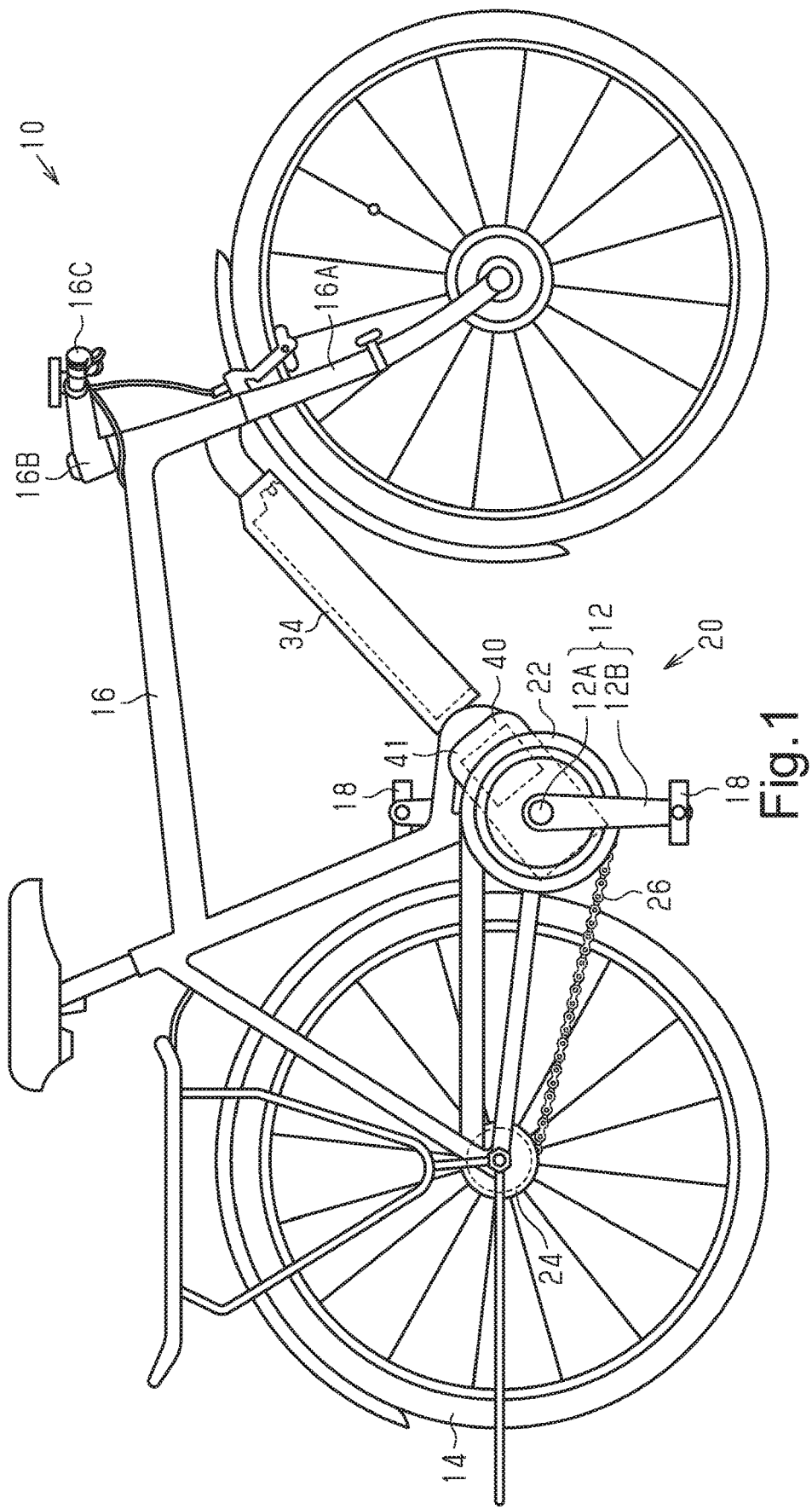
FIG. 1 is a side elevational view of a human-powered vehicle including a human-powered vehicle control device according to one embodiment.

A control device 50 for a human-powered vehicle according to one embodiment will now be described with reference to FIG. 1. Hereinafter, the control device 50 for the human-powered vehicle will simply be referred to as the control device 50. The control device 50 is provided in a human-powered vehicle 10. The human-powered vehicle 10 is a vehicle that can be driven by at least a human drive force. The human-powered vehicle 10 includes, for example, a bicycle. The number of wheels in the human-powered vehicle 10 is not limited, and for example, the human-powered vehicle also includes a unicycle and a vehicle having three or more wheels. Bicycles include, for example, mountain bikes, road bikes, city bikes, cargo bikes, and recumbent bikes. Hereinafter, the human-powered vehicle 10 will be described as a bicycle in the embodiment.

The human-powered vehicle 10 includes a crank 12 and a drive wheel 14. The human-powered vehicle 10 further includes a frame 16. The human drive force H is input to the crank 12. The crank 12 includes a crankshaft 12A rotatable relative to the frame 16 and crank arms 12B provided on two axial ends of the crankshaft 12A. A pedal 18 is connected to each crank arm 12B. The drive wheel 14 is driven by the rotation of the crank 12. The drive wheel 14 is supported by the frame 16. The crank 12 and the drive wheel 14 are connected by a drive mechanism 20. The drive mechanism 20 includes a first rotary body 22 coupled to the crankshaft 12A. The crankshaft 12A and the first rotary body 22 can be coupled by a first one-way clutch. The first one-way clutch is configured so as to rotate forward the first rotary body 22 in a case where the crank 12 is rotated forward and not to rotate backward the first rotary body 22 in a case where the crank 12 is rotated backward. The first rotary body 22 includes a sprocket, a pulley, or a bevel gear. The drive mechanism 20 further includes a linking member 26 and a second rotary body 24. The linking member 26 transmits the rotational force of the first rotary body 22 to the second rotary body 24. The linking member 26 includes, for example, a chain, a belt, or a shaft.

The second rotary body 24 is connected to the drive wheel 14. The second rotary body 24 includes a sprocket, a pulley, or a bevel gear. A second one-way clutch is preferably provided between the second rotary body 24 and the drive wheel 14. The second one-way clutch is configured so as to cause the drive wheel to rotate forward in a case where the second rotary body 24 rotates forward, and not to cause the drive wheel 14 to rotate backward in a case where the second rotary body 24 rotates backward.

The human-powered vehicle 10 includes a front wheel and a rear wheel. The front wheel is attached to the frame 16 by a front fork 16A. A handlebar 16C is connected to the front fork 16A by a stem 16B. In the following embodiment, the rear wheel will be described as the drive wheel 14 but the front wheel can be the drive wheel 14.

A human-powered vehicle control system 30 includes electric components 32, a battery 34, and a control device 50. The electric components 32 include a first electric component 32A and a second electric component 32B. In one example, the electric components 32 include a transmission 36. In one example, the electric components 32 include a motor 40.

The second electric component 32B includes the transmission 36 and an actuator 38. The transmission 36 is configured to change a first ratio R of sixteen rotational speeds of the drive wheel to the rotational speed N of the crank 12. The transmission 36 is configured to change the first ratio R in stages. Preferably, the first ratio R can be changed to, for example, 2 to 24 stages. The actuator 38 causes the transmission 36 to perform a shift operation. The transmission 36 is controlled by an electronic controller 52 of the control device 50. The actuator 38 is connected to the electronic controller 52 in a manner allowing for wired or wireless communication. The actuator 38 is configured to communicate with the electronic controller 52, for example, through power line communication (PLC). The actuator 38 causes the transmission 36 to perform a shift operation in accordance with a control signal from the electronic controller 52. The transmission 36 includes at least one of an internal transmission and an external transmission (derailleur).

The first electric component 32A includes the motor 40 and a drive circuit 42. Preferably, the motor 40 and the drive circuit 42 are provided in the same housing 41. The housing 41 is provided on the frame 16. The drive circuit 42 controls the electric power supplied from the battery 34 to the motor 40. The drive circuit 42 is connected to the electronic controller 52 of the control device 50 in a manner allowing for wired or wireless communication. The drive circuit 42 is configured to communicate with the electronic controller 52, for example, through serial communication. The drive circuit 42 drives the motor 40 in accordance with a control signal from the electronic controller 52. The motor 40 assists the propulsion of the human-powered vehicle 10. The motor 40 includes an electric motor. The motor 40 transmits rotation to the front wheel or to a transmission path of the human drive force H extending from the pedals 18 to the rear wheel. The motor 40 is provided on the frame 16, the rear wheel, or the front wheel of the human-powered vehicle 10. In one example, the motor 40 is coupled to a power transmission path extending from the crankshaft 12A to the first rotary body 22. Preferably, the power transmission path between the motor 40 and the crankshaft 12A includes a one-way clutch so that the motor 40 is not rotated by the rotational force of the crank 12 in a case where the crankshaft 12A is rotated in the direction in which the human-powered vehicle 10 moves forward. The housing of the motor 40 and the drive circuit 42 can be provided with components other than the motor 40 and the drive circuit 42. For example, the housing can be provided with a speed reducer that decelerates and outputs the rotation of the motor 40.

The battery 34 includes one or more battery cells. The battery cell includes a rechargeable battery. The battery 34 is provided on the human-powered vehicle 10 to supply electric power to other electric parts such as the motor 40, the actuator 38, and the control device 50 that are electrically connected to the battery 34 by wires. The battery 34 is connected to the electronic controller 52 in a manner allowing for wired or wireless connection. The battery 34 is configured to communicate with the electronic controller 52, for example, through PLC. The battery 34 can be attached to the outside of the frame 16 and can be at least partially accommodated in the frame 16.

The control device 50 includes the electronic controller 52. In one example, the control device 50 further includes a storage 54, a first detector 56, a second detector 58, a crank rotation sensor 60, a vehicle speed sensor 62, a torque sensor 64, and an operation part 66.

Figure 2:
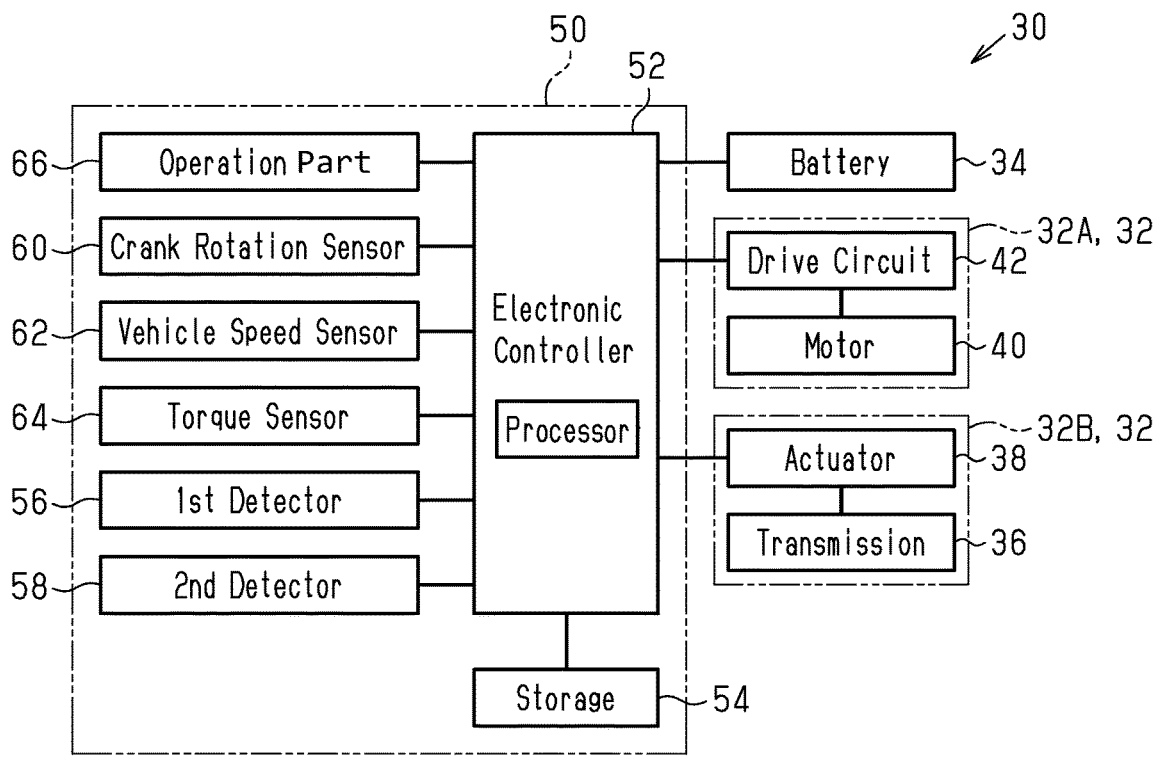
FIG. 2 is a block diagram showing an electrical configuration of the human-powered vehicle control device according to the embodiment.

The crank rotation sensor 60 shown in FIG. 2 detects the rotational speed N of the crank 12. The crank rotation sensor 60 is attached to the frame 16 of the human-powered vehicle 10 or the housing of the motor 40. The crank rotation sensor 60 includes a magnetic sensor that outputs a signal corresponding to the intensity of a magnetic field. An annular magnet, of which the magnetic field intensity changes in the circumferential direction, is provided on the crankshaft 12A or the power transmission path between the crankshaft 12A and the first rotary body 22. The crank rotation sensor 60 is connected to the electronic controller 52 in a manner allowing for wired or wireless communication. The crank rotation sensor 60 outputs a signal corresponding to the rotational speed N of the crank 12 to the electronic controller 52.

The crank rotation sensor 60 can be provided on a member that rotates integrally with the crankshaft 12A in the transmission path of the human drive force from the crankshaft 12A to the first rotary body 22. For example, the crank rotation sensor 60 can be provided in the first rotary body 22 in a case where the one-way clutch is not provided between the crankshaft 12A and the first rotary body 22.

The vehicle speed sensor 62 detects the rotational speed of a wheel. The vehicle speed sensor 62 is electrically connected to the electronic controller 52 in a wired or wireless manner. The vehicle speed sensor 62 is connected to the electronic controller 52 in a manner allowing for wired or wireless communication. The vehicle speed sensor 62 outputs a signal corresponding to the rotational speed of the wheel to the electronic controller 52. The electronic controller 52 calculates a vehicle speed V of the human-powered vehicle 10 based on the rotational speed of the wheel. The electronic controller 52 stops the motor 40 when the vehicle speed V becomes higher than or equal to the predetermined value. The predetermined value is, for example, 25 kilometers per hour or 45 kilometers per hour. The vehicle speed sensor 62 preferably includes a magnetic reed, which forms a reed switch, or a Hall element. The vehicle speed sensor 62 can be attached to the chain stay of the frame 16 and configured to detect a magnet attached to the rear wheel or can be configured to detect a magnet provided on the front fork 16A and attached to the front wheel.

The torque sensor 64 is provided on the housing of the motor 40. The torque sensor 64 detects the human drive force H input to the crank 12. The torque sensor 64 is provided, for example, on the upstream side of the first one-way clutch in the power transmission path. The torque sensor 64 includes a strain sensor, a magnetic strain sensor, or the like. The strain sensor includes a strain gauge. In a case where the torque sensor 64 includes a strain sensor, the strain sensor is provided on the outer circumferential portion of the rotary body included in the power transmission path. The torque sensor 64 can include a wired or wireless communication unit. The communication unit of the torque sensor 64 is configured to communicate with the electronic controller 52.

The first detector 56 is configured to detect the state of the rider. The state of the rider includes at least one of a posture of the rider and biological information of the rider. The first detector 56 includes at least one of the crank rotation sensor 60, the vehicle speed sensor 62, the torque sensor 64, a first sensor, a second sensor, a third sensor, a fourth sensor, a fifth sensor, a sixth sensor, and a seventh sensor.

In a case where the first detector 56 includes the crank rotation sensor 60, the electronic controller 52 detects the state of the rider according to the rotational speed N of the crank 12 detected by the crank rotation sensor 60. For example, the state of the rider includes the fatigue of the rider. In a case where the rider is tired, the rotational speed N of the crank 12 is lower than that in a case where the rider is not tired. In a case where the rotational speed N of the crank 12 is lower than a predetermined value, the electronic controller 52 determines that the fatigue degree of the rider is high. The rotational speed N includes at least one of an average value of a predetermined time, a moving average value of a predetermined time, and a largest value in a predetermined time, continuous value in a predetermined time, or an intermittent value in a predetermined time.

In a case where the first detector 56 includes the vehicle speed sensor 62, the electronic controller 52 detects the state of the rider based on the vehicle speed V detected by the vehicle speed sensor 62. For example, the state of the rider includes the fatigue of the rider. In a case where the rider is tired, the vehicle speed V is lower than that in a case where the rider is not tired. In a case where the vehicle speed V is lower than the predetermined vehicle speed, the electronic controller 52 determines that the fatigue degree of the rider high. The vehicle speed V includes at least one of an average value of a predetermined time, a moving average value of a predetermined time, a largest value in a predetermined time, a continuous value in a predetermined time, and an intermittent value in a predetermined time.

In a case where the first detector 56 includes the torque sensor 64, the electronic controller 52 determines the state of the rider based on the human drive force H detected by the torque sensor 64. For example, the state of the rider includes the posture of the rider. In a case where the rider is taking a standing pedaling posture, the force applied to the crank 12 is larger than that in a case where the rider is taking a seated pedaling posture. The electronic controller 52 determines the posture of the rider from the magnitude of the force applied to the crank 12 and detected by the torque sensor 64. For example, in a case where the torque of the human drive force H becomes larger than or equal to the first torque from a state in which it was smaller than the first torque, the electronic controller 52 determines that the rider has shifted from a seated pedaling posture to a standing pedaling posture. In a case where the torque of the human drive force H becomes smaller than the first torque from a state in which it was larger than or equal to the first torque, the electronic controller 52 determines that the rider has shifted from a standing pedaling posture to a seated pedaling posture. The electronic controller 52 can determine that the rider has shifted from a standing pedaling posture to a seated pedaling posture in a case where the torque of the human drive force H becomes smaller than a third torque, which differs from the first torque, from a state in which it was larger than or equal to the third torque.

For example, in a case where the rider is in a standing posture, the force applied to the pedals is larger than that in a case where the rider is in a seated posture. The electronic controller 52 determines the posture of the rider from the magnitude of the force applied to the pedals detected by the torque sensor 64. For example, in a case where the magnitude of the force applied to the pedals and the rotation angle of the crank 12 satisfy a predetermined relationship, the electronic controller 52 can determine that the rider is standing. The electronic controller 52 can determine that the rider is standing if the magnitude of the force applied to the pedal becomes larger than or equal to a predetermined value.

In a case where the first detector 56 includes the torque sensor 64, the electronic controller 52 can detect the fatigue degree of the rider from the human drive force H detected by the torque sensor 64. In a case where the rider is tired, the human drive force H is lower than that in a case where the rider is not tired. In a case where the human drive force H becomes smaller than a predetermined value, the electronic controller 52 determines that the fatigue degree of the rider is high. The human drive force H includes at least one of an average value of a predetermined time, a moving average value of a predetermined time, a largest value in a predetermined time, a continuous value in a predetermined time, and an intermittent value in a predetermined time.

The first sensor detects the force applied to the frame 16. The first sensor is provided, for example, on the frame 16 and detects the strain of the frame 16. The first sensor outputs a signal corresponding to the force applied to the frame 16. In the case where the rider is taking a standing pedaling posture, the strain of the frame 16 is larger than that in a case where the rider is taking a seated pedaling posture. The electronic controller 52 determines the posture of the rider from to the magnitude of the strain of the frame 16 detected by the first sensor. The first sensor includes, for example, a strain sensor. For example, when the strain amount of the frame 16 becomes larger than or equal to a predetermined value, the electronic controller 52 determines that the rider is standing pedaling. The first sensor can be provided, for example, on the front fork 16A instead of the frame 16.

The second sensor detects the force applied to the saddle. The second sensor is provided, for example, on the saddle and detects the load of the rider applied to the saddle. The second sensor outputs a signal corresponding to the force applied to the saddle. In a case where the rider is taking a standing pedaling posture, the force applied to the saddle is smaller than that in a case where the rider is taking a seated pedaling posture. The electronic controller 52 determines the posture of the rider from the magnitude of the force applied to the saddle detected by the second sensor. The second sensor includes, for example, a pressure sensor or a strain sensor. For example, when the load of the rider applied to the saddle becomes smaller than the predetermined value, the electronic controller 52 determines that the rider is standing pedaling.

The third sensor detects the force applied to the seatpost. The third sensor is provided, for example, on the seatpost and detects the load of the rider applied to the seatpost. The third sensor outputs a signal corresponding to the force applied to the seatpost. In a case where the rider is taking a standing pedaling posture, the force applied to the seatpost is smaller than a case where the rider is taking a seated pedaling posture. Th electronic e controller 52 determines the posture of the rider from the magnitude of the force applied to the seatpost detected by the third sensor. The third sensor includes, for example, a strain sensor. For example, when the load of the seatpost is smaller than a predetermined value, the electronic controller 52 determines that the rider is standing pedaling.

The fourth sensor detects the force applied to the handlebar 16C. The fourth sensor is provided, for example, on the handlebar 16C and detects the load of the rider applied to the handlebar 16C. The fourth sensor outputs a signal corresponding to the force applied to the handlebar 16C. In a case where the rider is taking a standing pedaling posture, the force applied to the handlebar 16C is larger than that in a case where the rider is taking a seated pedaling posture. The electronic controller 52 determines the posture of the rider from the magnitude of the force applied to the handlebar 16C detected by the fourth sensor. The fourth sensor includes, for example, a strain sensor. For example, when the load of the handlebar 16C is larger than or equal to a predetermined value, the electronic controller 52 determines that the rider is standing. The fourth sensor can be provided, for example, on the stem 16B instead of the handlebar 16C.

The fourth sensor includes a camera. The fourth sensor is mounted on the human-powered vehicle 10. The fourth sensor, for example, is provided on the handlebar 16C and detects an image rearward from the handlebar 16C. The fourth sensor outputs at least one of image data and video data of the rider. The electronic controller 52 determines the posture of the rider based on at least one of the image data and the video data of the rider acquired by the fourth sensor. For example, the electronic controller 52 compares the image data of the rider with predetermined image data and determines that the rider is standing pedaling when the similarity is larger than or equal to a predetermined value.

The fifth sensor detects an inclination in the roll direction of the human-powered vehicle 10. The fifth sensor includes, for example, an inclination sensor. The inclination sensor includes, for example, at least one of a gyro-sensor and an acceleration sensor. The fifth sensor is provided, for example, on the frame 16 or the housing 41 and detects the inclination in the roll direction of the human-powered vehicle 10. The fifth sensor outputs a signal corresponding to the inclination of the human-powered vehicle 10 in the roll direction. In a case where the rider is taking a standing pedaling posture, the amount of movement of the frame 16 in the roll direction is larger than that in the case where the rider is taking a seated pedaling posture. The electronic controller 52 determines the posture of the rider from the inclination of the human-powered vehicle 10 in the roll direction detected by the fifth sensor. The electronic controller 52 determines that the rider is standing pedaling if, for example, the inclination in the roll direction of the frame 16 repeatedly becomes larger than or equal to the predetermined value and smaller than the predetermined value within the predetermined time.

The sixth sensor detects the acceleration in the roll direction of the human-powered vehicle 10. The sixth sensor includes, for example, an acceleration sensor. The sixth sensor is provided, for example, on the frame 16 or the housing 41 and detects the acceleration in the roll direction of the human-powered vehicle 10. The sixth sensor outputs a signal corresponding to the acceleration in the roll direction of the human-powered vehicle 10. In a case where the rider is taking a standing pedaling posture, the acceleration in the roll direction of the frame 16 is larger than that in a case where the rider is taking a seated pedaling posture. The electronic controller 52 determines the posture of the rider from the acceleration in the roll direction of the human-powered vehicle 10 detected by the sixth sensor. The electronic controller 52 determines that the rider is standing pedaling if, for example, the acceleration in the roll direction of the frame 16 repeatedly becomes larger than or equal to the predetermined value and smaller than the predetermined value within the predetermined time.

For example, the state of the rider includes the physical condition of the rider. The seventh sensor detects the physical condition of the rider. The seventh sensor detects, for example, the heartrate of the rider. The seventh sensor is configured to be attached to, for example, the handlebar 16C of the human-powered vehicle 10 or the body of the rider. The seventh sensor outputs a signal corresponding to the heartrate of the rider. In a case where the seventh sensor is configured to be attached to the body of the rider, the seventh sensor can output a signal corresponding to the heartrate of the rider to the electronic controller 52 through wireless communication. The seventh sensor can detect the blood flow of the rider.

Table 1 shows an example of a combination of the state of the rider and the first detector 56 detecting the state of the rider.

TABLE 1

| State of rider | 1st detector | Detection parameters |
| --- | --- | --- |
| Physical condition | Electrocardiographic waveform measurement sensor | Action of autonomic nerve |
| Physical condition | Brain wave sensor | Activation level of brain |
| Physical condition | Amylase activation level measuring device | Activation level of amylase in saliva |
| Physical condition | Alcohol detector | Alcohol concentration in exhaled breath |
| Feeling by time period | Illumination sensor | Illuminance |
| Feeling by time period | Clock | At least one of time and time period |

TABLE 1-continued

| State of rider | 1st detector | Detection parameters |
| --- | --- | --- |
| Degree of fatigue | Sphygmomanometer | Fluctuation in blood pressure |
| Degree of fatigue | Electrocardiographic waveform measurement sensor | Action of autonomic nerve |
| Degree of fatigue | Surface myoelectric potential sensor | Activation level of muscle |
| Degree of fatigue | Oxygen sensor | Oxygen concentration in exhaled breath |
| Degree of fatigue | Electroencephalograph | Brain wave |
| Degree of fatigue | Torque sensor | At least one of average value of human drive force, moving average value of human drive force, largest value of human drive force, continuous value of human drive force, and intermittent value of the human drive force |
| Degree of fatigue | Crank rotation sensor | At least one of average value of crank rotational speed, moving average value of crank rotational speed, largest value of crank rotational speed, continuous value of crank rotational speed, and intermittent value of crank rotational speed |
| Degree of fatigue | Heartrate monitor | Heartrate |
| Mental state | Electrocardiographic waveform measurement sensor | Action of autonomic nerve |
| Mental state | Sphygmomanometer | Fluctuation in blood pressure |
| Mental state | Skin potential sensor | Mental activity state |
| Mental state | Cerebral blood flow meter | Brain blood flow |
| Individual state | Surface myoelectric potential sensor | At least one of muscle mass and back muscle strength |
| Individual state | Load sensor | Body weight |
| Individual state | Body fat scale | Body fat mass |
| Individual state | Sphygmomanometer | Blood pressure |
| Individual state | Pulse wave sensor | Pulse |
| Mood in running state | Vehicle speed sensor | Vehicle speed |
| Mood in running state | Acceleration sensor | Acceleration of human-powered vehicle |
| Mood in running state | Motion sensor | Posture of human-powered vehicle |
| Mood in running state | Gyro sensor | Posture of human-powered vehicle |
| Mood in running state | GPS | Road gradient |
| Mood in running state | Pressure sensor | Road gradient |
| Mood in running state | Torque sensor | Human drive force |
| Feeling by running state | Crank rotation sensor | Crank rotational speed |

The rider is in a good physical condition in a case where the rider had sufficient sleep, the season is comfortable such as in spring and autumn, the climate is good, the day is a holiday or the day before a holiday, etc. Furthermore, the rider is in a poor physical condition in a case where the rider did not have sufficient sleep, has a hangover, has caught a cold and is sick, or is irritated by stress, etc. The action of autonomic nerve, the activation level of the brain, the activation level of the amylase in saliva, and the alcohol concentration in the exhaled breath can be used as indices for the physical condition of the rider. The activation level of the amylase in the saliva can be an index of stress. The alcohol concentration in the exhaled breath can be an index for a hangover.

The mood of a rider changes in accordance with the time period. The mood tends to be lower at night, during which is dark, than during day, during which there is light. The illuminance and the time can be indices of the mood of the rider that depend on the time period.

The degree of fatigue of the rider is high, after work, after overtime work, in a hungry state, and in a case where the continuous exercise time is long. The degree of fatigue of the rider is low in a case where the rider starts exercising and is in an elated mood, in a case where the rider is in an elevated mood such as runner's high, in a case where the rider has had sufficient rest, and in a case where the rider has ingested sufficient nutrition. The fluctuation in the blood pressure, the autonomous motion, the activation level of the muscle, the oxygen concentration in the exhaled breath, the brain wave, the average value of the human drive force, the moving average value of the human drive force, the largest value of the human drive force, the continuous value of the human drive force, the intermittent value of the human drive force, the average value of the rotational speed N of the crank 12, the moving average value of the rotational speed N of the crank 12, the largest value of the rotational speed N of the crank 12, the continuous value of the rotational speed N of the crank 12, the intermittent value of the rotational speed N of the crank 12 and the heartrate can be indices for the degree of fatigue of the rider. The oxygen concentration in the exhaled breath can be used to determine whether the rider is performing an anaerobic exercise or an aerobic exercise, and a change from anaerobic exercise to aerobic exercise can be used as an index in a case where the rider is starting exercising and is in an elated mood. The brain wave can be an index of a manic state, a depressed state, and an excited state. The average value of the human drive force, the moving average value of the human drive force, the largest value of the human drive force, the continuous value of the human drive force, and the intermittent value of the human drive force can be indices of a state of high degree of fatigue in a case where such values lower. The average value of the rotational speed N of the crank 12, the moving average value of the rotational speed N of the crank 12, the largest value of the rotational speed N of the crank 12, the continuous value of the rotational speed N of the crank 12, and the intermittent value of the rotational speed N of the crank 12 can be used in case they are decreased as indices of a state of high degree of fatigue.

The mental state of the rider is in a positive state if the rider is having fun, is feeling happy, is in an elated mood, feeling a moderate degree of tension such as during a race, or is wishing to win a match. Furthermore, the mental state of the rider is in a negative state if the rider is depressed, feeling blue, not in the mood, or is worrying about something. The action of autonomic nerve, the fluctuation in the blood pressure, the mental activity state, and the brain blood flow can be indices of the mental state of the rider.

The individual state of the rider differs in accordance with sex, age, body weight, body fat mass, tension, muscular strength, blood pressure, blood flow, and exercise experience. The muscle mass, the back muscle strength, the body weight, the body fat mass, the blood pressure, and the pulse can be used as indices of the individual state of the rider. The muscle mass, the back muscle strength, the body weight, the body fat mass, the blood pressure, and the pulse can be used as indices of sex and age.

The mood of the rider changes in accordance with the running state. In a case where the rider is riding the human-powered vehicle 10 on a downhill and a case where the rider is riding the human-powered vehicle 10 at a high speed, the mood of the rider tends to be elevated. The vehicle speed, the acceleration of the human-powered vehicle 10, the posture of the human-powered vehicle 10, the road gradient, the human drive force H, and the rotational speed N of the crank 12 can be used as indices of the mood of the rider resulting from running state.

The state of the rider can be detected by combining a plurality of sensors among the sensors exemplified as the first detector 56. In addition, a composite state obtained by combining a plurality of states of the rider can be assumed as the state of the rider.

The second detector 58 is configured to detect the running state of the human-powered vehicle 10. The running state of the human-powered vehicle 10 includes at least one of the inclination of the human-powered vehicle 10, the gradient of the road surface on which the human-powered vehicle 10 travels, and the condition of the road surface on which the human-powered vehicle 10 travels. The second detector 58 includes at least one of the crank rotation sensor 60, the vehicle speed sensor 62, the torque sensor 64, the fourth sensor, the fifth sensor, the sixth sensor, an eighth sensor, and a communication device.

The eighth sensor includes a camera. The eighth sensor is mounted on the human-powered vehicle 10. The eighth sensor is provided on, for example, the handlebar and detects an image of a road surface. The electronic controller 52 determines the condition of the road surface based on the imaged data of the road surface acquired by the eighth sensor. The condition of the road surface includes at least one of, for example, irregularities in the road surface and the friction coefficient of the road surface.

The communication device includes a global positioning system (GPS) receiver and is configured to be connected to the Internet. The communication device acquires at least one of the gradient of the road surface on which the human-powered vehicle 10 travels and the condition of the road surface from the GPS and the Internet. The communication device does not have to be connected to the Internet. In such a case, map data can be stored in a storage.

Table 2 shows an example of a combination of the running state of the human-powered vehicle 10 and the second detector 58 detecting the running state of the human-powered vehicle 10.

TABLE 2

| Running state | 2nd detector | Detection parameters |
| --- | --- | --- |
| Riding environment | Thermometer | At least one of temperature, temperature change, and temperature range |
| Riding environment | Hygrometer | Humidity |
| Riding environment | Wind speed sensor | At least one of wind speed, tailwind, and headwind |
| Riding environment | Thermometer | At least one of body temperature and body temperature change |
| Riding environment | Perspiration meter | Perspiration amount |
| Riding environment | Potential sensor | At least one of skin potential and skin electrical resistance |
| Condition of road surface | Acceleration sensor | Acceleration of human-powered vehicle |
| Condition of road surface | Tire air pressure sensor | Tire air pressure |
| Condition of road surface | Tire temperature sensor | Tire temperature |
| Condition of road surface | Image sensor | Road surface image |

TABLE 2-continued

| Running state | 2nd detector | Detection parameters |
| --- | --- | --- |
| Condition of road surface | Ground speedometer | At least one of speed of human-powered vehicle, behavior of human-powered vehicle, and moving direction of human-powered vehicle |
| Condition of road surface | Hygrometer | Humidity |
| Gradient of road surface | Inclination sensor | Gradient of road surface |

The running state of the human-powered vehicle 10 includes a Riding environment. The Riding environment includes temperature, humidity, altitude, wind, and weather. Temperature, temperature change, temperature range, humidity, wind speed, tailwind, headwind, body temperature, body temperature change, perspiration amount, skin potential, and skin electrical resistance can be indices of the Riding environment. The body temperature and the body temperature change can be indices of at least one of temperature, temperature change, humidity, and wind. The perspiration amount, the skin potential, and the skin electrical resistance can be indices of the weather. The thermometer and the hygrometer can detect the temperature and the humidity inside the clothing of the rider. The wind speed sensor can detect the air volume passing through the inside the clothing of the rider.

The condition of the road surface includes a muddy road surface, a road surface wet with rain etc., a dry road surface, a paved road, a dirt road, a road surface with snow, a road surface on which leaves have fallen, a rocky road surface, and a road surface with many pebbles. The acceleration of the human-powered vehicle 10, the tire air pressure, the tire temperature, a road surface image, the speed of the human-powered vehicle, the behavior of the human-powered vehicle, the moving direction of the human-powered vehicle, and the humidity can be indices of the condition of the road surface.

The running state of the human-powered vehicle 10 can also be detected by combining a plurality of sensors among the sensors exemplified as the second detector 58. In addition, the composite state combining the running state of the human-powered vehicle 10 can be assumed as the running state of the human-powered vehicle 10.

The electronic controller 52 includes a processor that executes a control program defined in advance. The term "electronic controller" as used herein refers to hardware that executes a software program. The processor includes, for example, a central processing unit (CPU) or a micro-processing unit (MPU). The electronic controller 52 can include one or more microcomputers. The storage 54 is configured to store various control programs and information used for various control processes. The storage 54 includes, for example, a nonvolatile memory and a volatile memory. The nonvolatile memory includes, for example, a read only memory (ROM), a hard disk, and a flash memory. The volatile memory includes, for example, a random access memory (RAM). The electronic controller 52 and the storage 54 are, for example, provided on the housing 41 of the motor 40.

The electronic controller 52 is configured to control the electric component 32 of the human-powered vehicle 10. The electronic controller 52 changes the second ratio A of the drive force assisting the propulsion of the human-powered vehicle 10 to the human drive force H. The electronic controller 52 controls the motor 40 so that the assist force of the motor 40 to the human drive force H becomes equal to the second ratio A. The electronic controller 52 is configured to change the second ratio A in stages. Preferably, the second ratio A can be changed to, for example, 2 to 10 stages. In the present embodiment, the ratio of the torque of the assist force generated by the motor 40 to the torque of the human drive force H input to the human-powered vehicle 10 is referred to as the second ratio A. In a case where the output of the motor 40 is input to the human driving path via the speed reducer, the output of the speed reducer is used as the assist force by the motor 40.

The electronic controller 52 is configured to be switched between the first control state and the second control state.

In the first control state, the electronic controller 52 is configured to control the electric component 32 so as to change at least one of the first ratio R and the second ratio A if the human drive force H that is in the predetermined range W goes out of the predetermined range W. The predetermined range W includes a first range W1 relating to the human drive force H and a second range W2 related to the rotational speed N of the crank 12. In the first control state, when the human drive force H shifts from the first range W1 to outside the first range W1, the electronic controller 52 is configured to control the electric component 32 and change at least one of the first ratio R and the second ratio A. In the first control state, when the rotational speed N of the crank 12 that is in the second range W2 goes out of the second range W2, the electronic controller 52 is configured to control the electric component 32 and change at least one of the first ratio R and the second ratio A.

In the second control state, the electronic controller 52 does not change the first ratio R and the second ratio A even when the human drive force that is in the predetermined range W goes out of the predetermined range W. In the second control state, the electronic controller 52 does not change the first ratio R and the second ratio A even when the human drive force H shifts from the first range W1 to outside the first range W1. In the second control state, the electronic controller 52 does not change the first ratio R and the second ratio A even when the rotational speed N of the crank 12 that is in the second range W2 goes out of the second range W2.

The storage 54 is configured to store the first range W1. Preferably, the storage 54 is configured to store a plurality of first ranges W1. The first ranges W1 stored in the storage 54 at least partially differ from one another in the range of the human drive force H. The storage 54 is configured to store the second range W2. Preferably, the storage 54 is configured to store a plurality of second ranges W2. The second ranges W2 stored in the storage 54 at least partially differ from one another in the range of the rotational speed N of the crank 12. The storage 54 can be configured to store the first range W1 and the second range W2 separately. Alternatively, the storage 54 can be configured to store the predetermined range W including the first range W1 and the second range W2 to store the first range W1 and the second range W2. Preferably, in a case where the storage 54 stores the predetermined range W, the storage 54 stores a plurality of predetermined ranges W. The plurality of predetermined ranges W stored in the storage 54 at least partially differ from one another in at least one of the range of the human drive force H and the rotational speed N of the crank 12. The predetermined range W is stored, for example, as a map.

When the human drive force H input to the crank 12 shifts from the first range W1 to outside the first range W1, the electronic controller 52 is configured to control the electric component 32 to change at least one of the first ratio R and the second ratio A. In the present embodiment, when the human drive force H input to the crank 12 that is in the second range W2 goes out of the second range W2, the electronic controller 52 is configured to control the electric component 32 so as to change both the first ratio R and the second ratio A.

In a case where the human drive force H is higher than the first range W1, the electronic controller 52 is configured to control the electric component 32 and decrease the first ratio R. In a case where the human drive force H is lower than the first range W1, the electronic controller 52 is configured to control the electric component 32 and increase the first ratio R.

In a case where the human drive force H is higher than the first range W1, the electronic controller 52 is configured to control the electric component 32 and increase the second ratio A. In a case where the human drive force H is lower than the first range W1, the electronic controller 52 is configured to control the electric component 32 and decrease the second ratio A.

When the rotational speed N of the crank 12 that is in the second range W2 goes out of the second range W2, the electronic controller 52 is configured to control the electric component so as to change at least one of the first ratio R and the second ratio A. In the present embodiment, when the rotational speed N of the crank 12 that is in the second range W2 goes out of the second range W2, the electronic controller 52 is configured to control the electric component 32 and change both the first ratio R and the second ratio A.

In a case where the rotational speed N of the crank 12 is higher than the second range W2, the electronic controller 52 is configured to control the electric component 32 and increase the first ratio R. In a case where the rotational speed N of the crank 12 is lower than the second range W2, the electronic controller 52 is configured to control the electric component 32 and decrease the first ratio R.

In a case where the rotational speed N of the crank 12 is higher than the second range W2, the electronic controller 52 is configured to control the electric component 32 and increase the second ratio A. In a case where the rotational speed N of the crank 12 is lower than the second range W2, the electronic controller 52 is configured to control the electric component 32 and decrease the second ratio A.

Figure 3:
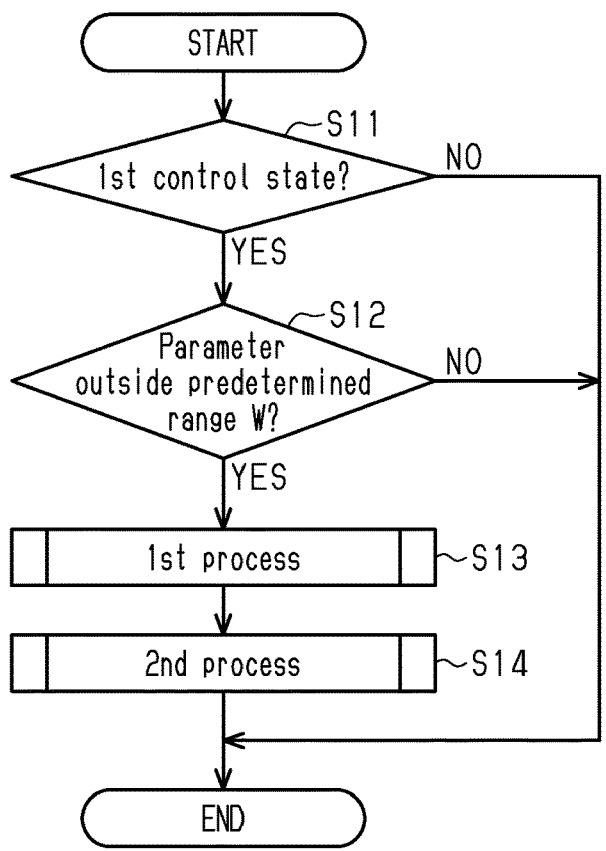
FIG. 3 is a flowchart of a process for changing a first ratio and a second ratio performed in a case of a first control state executed by an electronic controller of FIG. 2.

A process for changing the first ratio R and the second ratio A performed in the case of the first control state will now be described with reference to FIG. 3. When electric power is supplied from the battery 34 to the electronic controller 52, the electronic controller 52 starts the process and proceeds to step S11 of the flowchart shown in FIG. 3. As long as electric power is supplied, the electronic controller 52 executes the process from step S11 in predetermined cycles.

In step S11, the electronic controller 52 determines whether or not the electronic controller 52 is in the first control state. In a case where it is determined that the electronic controller 52 is not in the first control state, the electronic controller 52 ends the process. If determining in step S11 that the electronic controller 52 is in the first control state, the electronic controller 52 proceeds to step S12.

In step S12, the electronic controller 52 determines whether or not a parameter is outside the predetermined range W. For example, in a case where the human drive force H is outside the first range W1 and in a case where the rotational speed N of the crank 12 is outside the second range W2, the electronic controller 52 determines that the parameter is outside the predetermined range W. In a case where the storage 54 stores a map of the predetermined range W, the electronic controller 52 determines that the parameter is outside the predetermined range W in a case where the coordinates of the human drive force H and the rotational speed N of the crank 12 are outside the predetermined range W. If determining in step S12 that the parameter is not outside the predetermined range W, the electronic controller 52 ends the process.

In a case where it is determined in S12 that the parameter is outside the predetermined range, the electronic controller 52 proceeds to step S13. In step S13, the electronic controller 52 executes the first process and proceeds to step S14. In step S14, the electronic controller 52 executes the second process and ends the process.

A subroutine of the first process of the process for changing the first ratio R and the second ratio A performed in the first control state will now be described with reference to FIG. 4.

In step S21, the electronic controller 52 determines whether or not the human drive force H is higher than the first range W1. In a case where it is determined that the human drive force H is higher than the first range W1, the electronic controller 52 proceeds to step S22.

In step S22, the electronic controller 52 determines whether or not the first ratio R is larger than the smallest first ratio R. In a case where it is determined that the first ratio R is larger than the smallest first ratio R, the electronic controller 52 proceeds to step S23. In step S23, the electronic controller 52 actuates the transmission 36 to decrease the first ratio R and then proceeds to step S24. In a case where it is determined that the first ratio R is not larger than the smallest first ratio R in step S22, the electronic controller 52 proceeds to step S24 without performing the process of step S23.

In step S24, the electronic controller 52 determines whether or not the second ratio A is smaller than the largest second ratio A. In a case where it is determined that the second ratio A is smaller than the largest second ratio A, the electronic controller 52 proceeds to step S25. In step S25, the electronic controller 52 increases the second ratio A and ends the process. In a case where it is determined that the second ratio A is not smaller than the largest second ratio A in step S24, the electronic controller 52 ends the process without performing the process of step S25.

In a case where it is determined in step S21 that the human drive force H is not higher than the first range W1, the electronic controller 52 proceeds to step S26. In step S26, the electronic controller 52 determines whether or not the human drive force H is lower than the first range W1. In a case where it is determined that the human drive force H is not lower than the first range W1, the electronic controller 52 ends the process. In a case where it is determined that the human drive force H is lower than the first range W1, the electronic controller 52 proceeds to step S27.

In step S27, the electronic controller 52 determines whether or not the first ratio R is smaller than the largest first ratio R. In a case where it is determined in step S27 that the first ratio R is smaller than the largest first ratio R, the electronic controller 52 proceeds to step S28. In step S28, the electronic controller 52 actuates the transmission 36 to increase the first ratio R and then proceeds to step S29. In a case where it is determined in step S27 that the first ratio R is not smaller than the largest first ratio R, the electronic controller 52 proceeds to step S29 without performing the process of step S28.

In step S29, the electronic controller 52 determines whether or not the second ratio A is larger than the smallest second ratio A. In a case where it is determined that the second ratio A is larger than the smallest second ratio A, the electronic controller 52 proceeds to step S30. In step S30, the electronic controller 52 decreases the second ratio A and then ends the process. In a case where it is determined in step S29 that the second ratio A is not larger than the smallest second ratio A, the electronic controller 52 ends the process without performing the process of step S30.

A subroutine of the second process of the process for changing the first ratio R and the second ratio A performed in the first control state will now be described with reference to FIG. 5.

In step S41, the electronic controller 52 determines whether or not the rotational speed N of the crank 12 is higher than the second range W2. In a case where it is determined that the rotational speed N of the crank 12 is higher than the second range W2, the electronic controller 52 proceeds to step S42.

In step S42, the electronic controller 52 determines whether or not the first ratio R is smaller than the largest first ratio R. In a case where it is determined that the first ratio R is smaller than the largest first ratio R, the electronic controller 52 proceeds to step S43. In step S43, the electronic controller 52 actuates the transmission 36 to increase the first ratio R, and then proceeds to step S44. In a case where it is determined that the first ratio R is not smaller than the largest first ratio R in step S42, the electronic controller 52 proceeds to step S44 without performing the process of step S43.

In step S44, the electronic controller 52 determines whether or not the second ratio A is smaller than the largest second ratio A. In a case where it is determined that the second ratio A is smaller than the largest second ratio A, the electronic controller 52 proceeds to step S45. In step S45, the electronic controller 52 increases the second ratio A and ends the process. In a case where it is determined in step S44 that the second ratio A is not smaller than the largest second ratio A, the electronic controller 52 ends the process without performing the process of step S45.

In a case where it is determined in step S41 that the rotational speed N of the crank 12 is not higher than the second range W2, the electronic controller 52 proceeds to step S46. In step S46, the electronic controller 52 determines whether or not the rotational speed N of the crank 12 is lower than the second range W2. In a case where it is determined that the rotational speed N of the crank 12 is not lower than the second range W2, the electronic controller 52 ends the process. In a case where it is determined that the human drive force H is lower than the first range W1, the electronic controller 52 proceeds to step S47.

In step S47, the electronic controller 52 determines whether or not the first ratio R is larger than the smallest first ratio R. In a case where it is determined in step S47 that the first ratio R is larger than the smallest first ratio R, the electronic controller 52 proceeds to step S48. In step S48, the electronic controller 52 actuates the transmission 36 to decrease the first ratio R and then proceeds to step S49. In a case where it is determined in step S47 that the first ratio R is not larger than the smallest first ratio R, the electronic controller 52 proceeds to step S49 without performing the process of step S48.

In step S49, the electronic controller 52 determines whether or not the second ratio A is larger than the smallest second ratio A. In a case where it is determined that the second ratio A is larger than the smallest second ratio A, the electronic controller 52 proceeds to step S50. In step S50, the electronic controller 52 decreases the second ratio A and ends the process. In a case where it is determined in step S50 that the second ratio A is not larger than the smallest second ratio A, the electronic controller 52 ends the process without performing the process of step S50.

The electronic controller 52 changes the predetermined range W in accordance with at least one of the state of the rider and the running state of the human-powered vehicle 10. In the present embodiment, the electronic controller 52 changes the predetermined range W in accordance with the state of the rider. The electronic controller 52 changes the first range W1 in accordance with at least one of the state of the rider and the running state of the human-powered vehicle 10. In the present embodiment, the electronic controller 52 changes the first range W1 in accordance with the state of the rider. The electronic controller 52 changes the second range W2 in accordance with at least one of the state of the rider and the running state of the human-powered vehicle 10. In the present embodiment, the electronic controller 52 changes the second range W2 in accordance with the state of the rider.

The electronic controller 52 changes the predetermined range W by selecting one of a plurality of predetermined ranges W that at least partially differ from one another. The electronic controller 52 changes the first range W1 by selecting one of a plurality of ranges at least partially differing from one another as the first range W1. The electronic controller 52 changes the second range W2 by selecting one of a plurality of ranges at least partially differing from one another as the second range W2.

A process for changing the predetermined range W in accordance with the state of the rider will now be described with reference to FIG. 6. When electric power is supplied from the battery 34 to the electronic controller 52, the electronic controller 52 starts the process and proceeds to step S61 of the flowchart shown in FIG. 6. As long as electric power is supplied, the electronic controller 52 executes the process from step S61 in predetermined cycles.

In step S61, the electronic controller 52 determines whether or not the state of the rider has changed. In a case where it is determined that the state of the rider has not changed, the electronic controller 52 ends the process. In a case where it is determined that the state of the rider has changed, the electronic controller 52 proceeds to step S62.

In step S62, the electronic controller 52 changes the first range W1 and then proceeds to step S63. The electronic controller 52 changes the first range W1 by selecting the first range W1 corresponding to the current state of the rider from the first ranges W1 stored in the storage 54. In step S63, the electronic controller 52 changes the second range W2 and then ends the process. The electronic controller 52 changes the second range W2 by selecting the second range W2 corresponding to the current state of the rider from the second ranges W2 stored in the storage 54. The electronic controller 52 can change the first range W1 and the second range W2 by selecting a predetermined range W corresponding to the current state of the rider from the predetermined ranges W stored in the storage 54. In this case, the processes of step S62 and step S63 are performed in a single process.

Figure 6:
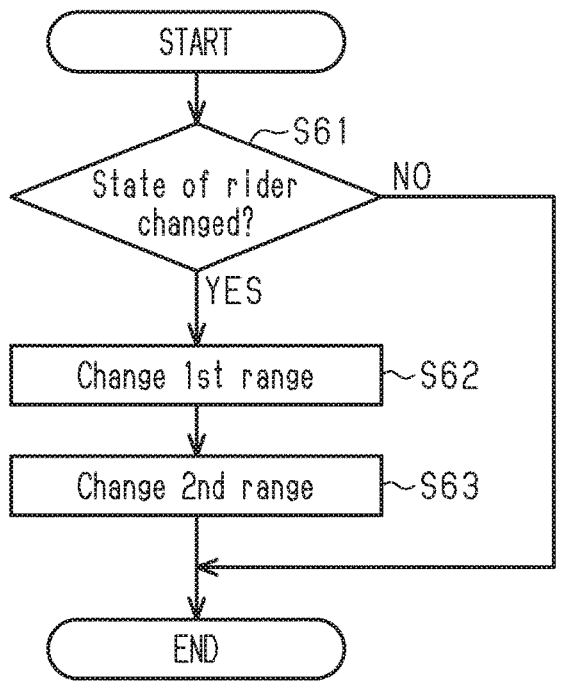
FIG. 6 is a flowchart of a process for changing a predetermined range in accordance with a state of a rider executed by the electronic controller of FIG. 2.
Figure 7:
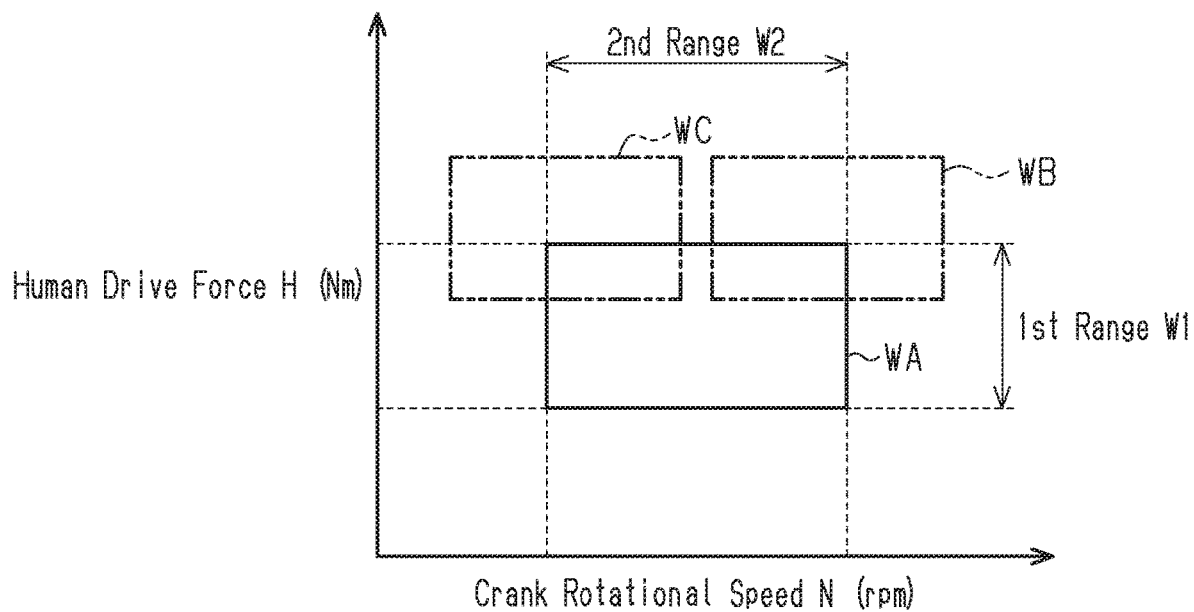
FIG. 7 is a map of a first range and a second range stored in the storage of FIG. 2.

FIG. 7 shows an example of a change in the predetermined range W performed in accordance with FIG. 6. For example, in a case where the posture of the rider changes from seated pedaling to standing pedaling, the electronic controller 52 changes the predetermined range W from the predetermined range WA indicated by solid lines in FIG. 7 to the predetermined range WB indicated by the double-dashed lines in FIG. 7. For example, in a case where the posture of the rider changes from seated pedaling to standing pedaling, the predetermined range W is changed from the predetermined range WB to the predetermined range WA. The smallest value of the human drive force H in the first range W1 included in the predetermined range WB is larger than the smallest value of the human drive force H in the first range W1 included in the predetermined range WA, and the largest value of the human drive force H in the first range W1 included in the predetermined range WB is larger than the largest value of the human drive force H in the first range W1 included in the predetermined range WA. The smallest value of the rotational speed N of the crank 12 in the second range W2 included in the predetermined range WB is larger than the smallest value of the rotational speed N of the crank 12 in the second range W2 included in the predetermined range WA and the largest value of the rotational speed N of the crank 12 in the second range W2 included in the predetermined range WB is larger than the largest value of the rotational speed N of the crank 12 in the second range W2 included in the predetermined range WA. In this example, in a case where the rider is standing pedaling, the crank 12 can be rotated so that the human drive force H is larger and the rotational speed N of the crank 12 is higher than a case where the rider is seated pedaling. This accelerates the human-powered vehicle 10.

For example, in a case where the posture of the rider changes from seated pedaling to standing pedaling, the electronic controller 52 changes the predetermined range W from the predetermined range WA indicated by the solid lines in FIG. 7 to the predetermined range WC indicated by the double-dashed lines in FIG. 7. For example, in a case where the posture of the rider changes from seated pedaling to standing pedaling, the predetermined range W is changed from a predetermined range WC to the predetermined range WA. The smallest value of the human drive force H in the first range W1 included in the predetermined range WC is larger than the smallest value of the human drive force H in the first range W1 included in the predetermined range WA and the largest value of the human drive force H in the first range W1 included in the predetermined range WC is larger than the largest value of the human drive force H in the first range W1 included in the predetermined range WA. The smallest value of the rotational speed N of the crank 12 in the second range W2 included in the predetermined range WC is smaller than the smallest value of the rotational speed N of the crank 12 in the second range W2 included in the predetermined range WA and the largest value of the rotational speed N of the crank 12 in the second range W2 included in the predetermined range WC is smaller than the largest value of the rotational speed N of the crank 12 in the second range W2 included in the predetermined range WA. In this example, in a case where the rider is standing pedaling, the crank 12 can be rotated so that the human drive force H is larger and the rotational speed N of the crank 12 is lower than a case where the rider is seated pedaling. This allows the human-powered vehicle 10 to be ridden in a suitable manner in a case where the riding load is high such as on an uphill.

For example, in a case where the rotational speed N of the crank 12 changes from a value higher than the predetermined value to a lower value, the electronic controller 52 changes the predetermined range W from the predetermined range WA indicated by solid lines in FIG. 7 to the predetermined range WC indicated by double-dashed lines in FIG. 7. For example, in a case where the rotational speed N of the crank 12 changes from a value lower than the predetermined value to a higher value, the predetermined range W is changed from the predetermined range WC to the predetermined range WA. In this example, in a case where the rider wishes to decrease the rotational speed N of the crank 12 while riding the human-powered vehicle 10, the crank 12 can be rotated so as to increase the human drive force H and decrease the rotational speed N of the crank 12 by decreasing the rotational speed N of the crank 12. This obtains the running state corresponding to the rotational speed N of the crank 12 desired by the rider.

For example, in a case where the degree of fatigue of the rider is in a low state, the electronic controller 52 sets the predetermined range W to the predetermined range WB indicated by the double-dashed lines in FIG. 7. In a case where the degree of fatigue of the rider is in a high state, the electronic controller 52 sets the predetermined range W to the predetermined range WA indicated by the solid lines in FIG. 7. In a case where the degree of fatigue of the rider changes from a low state to a high state, the electronic controller 52 sets the predetermined range W from the predetermined range WB indicated by double-dashed lines in FIG. 7 to the predetermined range WA indicated by solid lines. In a case where the degree of fatigue of the rider changes from a high state to a low state, the electronic controller 52 sets the predetermined range W from the predetermined range WA indicated by solid lines in FIG. 7 to the predetermined range WB indicated by double-dashed lines. In a case where the degree of fatigue of the rider is low, this example obtains a state where the rotational speed N of the crank and the human drive force H are lower than that in a case where the degree of fatigue is high is formed. Thus, the load on the rider can be reduced.

For example, in a case where the mood resulting the running state of the human-powered vehicle 10 changes from a normal state or lower to a high state, the electronic controller 52 sets the predetermined range W from the predetermined range WC indicated by double-dashed lines in FIG. 7 to the predetermined range WA indicated by solid lines. In this example, in a case where the rider is in an elevated mood because the rider is riding the human-powered vehicle 10 at a high speed, a state where the rotational speed N of the crank 12 is high is obtained. Thus, the vehicle speed V of the human-powered vehicle 10 can be further increased and the running state corresponding to the elevated mood of the rider can be obtained.

The electronic controller 52 switches between the first control state and the second control state in accordance with at least one of the state of the rider and the running state of the human-powered vehicle 10.

For example, the electronic controller 52 switches from the second control state to the first control state in a case where the posture of the rider changes from seated pedaling to standing pedaling, and the electronic controller 52 switches from the first control state to the second control state in a case where the posture of the rider changes from standing pedaling to seated pedaling. In a case of standing pedaling, it is difficult for the rider to carry out an operation for changing the first ratio R and the second ratio A. Thus, the convenience of the rider is improved by switching to the first control state in a case where the rider is standing pedaling. For example, the electronic controller 52 switches from the second control state to the first control state in a case where the heartrate of the rider becomes higher than or equal to a predetermined value from a value lower than the predetermined value, and the electronic controller 52 switches from the first control state to the second control state in a case where the heartrate of the rider becomes lower than a predetermined value from higher than or equal to the predetermined value. In a case where the heartrate of the rider is high, the electronic controller 52 is switched to the first control state thereby obtaining a running state suitable for the state of the rider. This improves the convenience of the rider.

For example, the electronic controller 52 switches between the first control state and the second control state in accordance with the riding load. For example, the electronic controller 52 switches from the second control state to the first control state in a case where the riding load becomes larger than or equal to a predetermined value from a value smaller than the predetermined value, and the electronic controller 52 switches from the first control state to the second control state in a case where the riding load becomes smaller than the predetermined value from larger than or equal to the predetermined value. The riding load includes, for example, the inclination angle of the road surface on which the human-powered vehicle 10 travels, the wind speed, and the state of the road surface.

Figure 8:
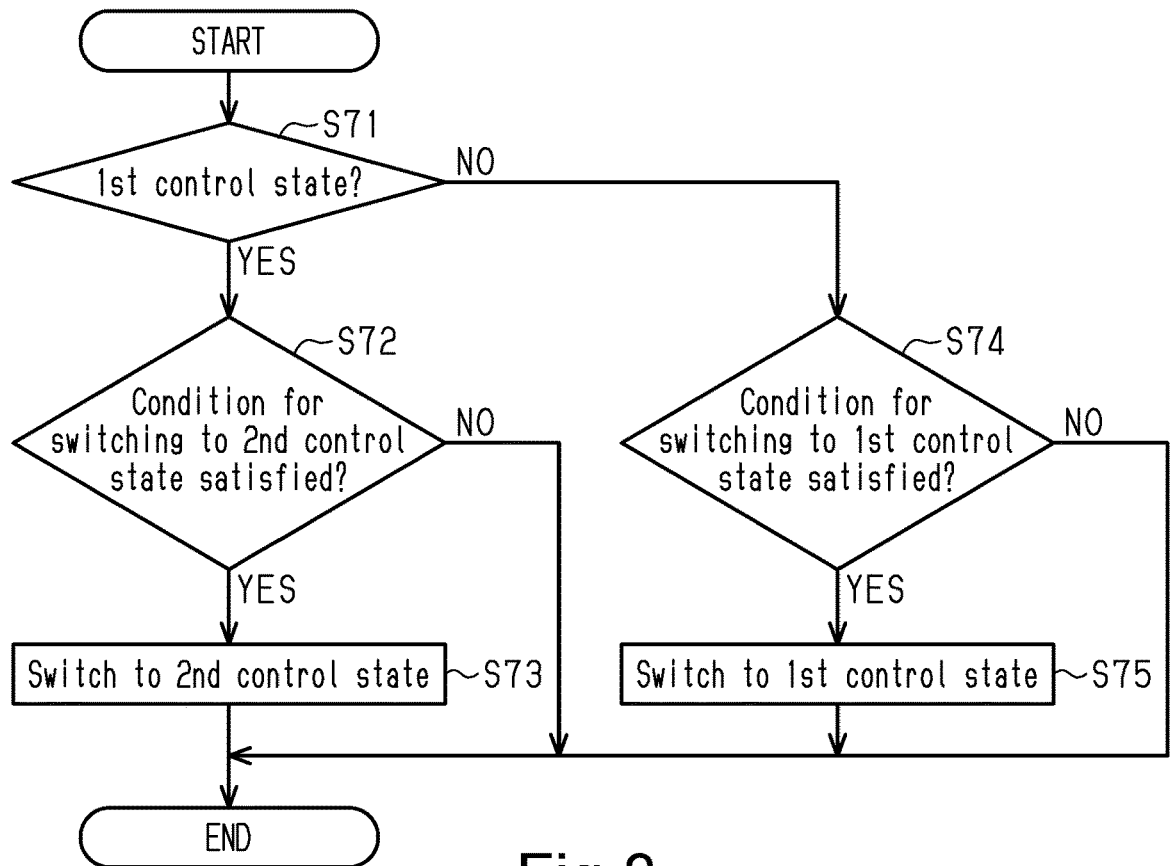
FIG. 8 is a flowchart of a process for switching a control state executed by the electronic controller of FIG. 2.

The process for switching between the first control state and the second control state will now be described with reference to FIG. 8. When electric power is supplied from the battery 34 to the electronic controller 52, the electronic controller 52 starts the process and proceeds to step S71 of the flowchart shown in FIG. 8. As long as electric power is supplied, the electronic controller 52 executes the process from step S71 in predetermined cycles.

In step S71, the electronic controller 52 determines whether or not the electronic controller 52 is in the first control state. In a case where it is determined that the electronic controller 52 is in the first control state, the electronic controller 52 proceeds to step S72. In step S72, the electronic controller 52 determines whether or not the condition for switching to the second control state has been satisfied. The electronic controller 52 determines whether or not the condition for switching to the second control state has been satisfied in accordance with the output of at least one of the first detector 56 and the second detector 58. The switching condition to the second control state is satisfied in a case where at least one of the state of the rider and the running state of the human-powered vehicle 10 is in a predetermined state. In a case where it is determined that the switching condition to the second control state is not satisfied, the electronic controller 52 ends the process. In a case where it is determined that the switching condition to the second control state is satisfied, the electronic controller 52 proceeds to step S73. In step S73, the electronic controller 52 switches to the second control state and then ends the process.

In a case where it is determined in step S71 that the electronic controller 52 is not in the first control state, the electronic controller 52 proceeds to step S74. In step S74, the electronic controller 52 determines whether or not the condition for switching to the first control state has been satisfied. The electronic controller 52 determines whether or not the condition for switching to the first control state has been satisfied in accordance with the output of at least one of the first detector 56 and the second detector 58. The condition for switching to the first control state is satisfied in a case where at least one of the state of the rider and the running state of the human-powered vehicle 10 is in a predetermined state. In a case where it is determined that the switching condition to the first control state is not satisfied, the electronic controller 52 ends the process. In a case where it is determined that the condition for switching to the first control state is satisfied, the electronic controller 52 proceeds to step S75. In step S75, the electronic controller 52 switches to the first control state and then ends the process.

As shown in FIG. 2, the human-powered vehicle 10 can include the operation part 66. The operation part 66 is operable by the rider. The operation part 66 is attached to the handlebar 16C of the human-powered vehicle 10. The operation part 66 includes, for example, an operation member, a sensor that detects movement of the operation member, and an electric circuit that communicates with the electronic controller 52 in accordance with an output signal of the sensor. The operation part 66 is connected to the electronic controller 52 in a manner allowing for wired or wireless communication. The operation part 66 is configured to communicate with the electronic controller 52 through, for example, PLC. When the operation part 66 is operated by the rider, the operation part 66 transmits the output signal to the electronic controller 52. The operation part 66 preferably includes one or more operation members. Each operation part 66 includes, for example, a push switch, a lever type switch, or a touch panel.

The electronic controller 52 changes the first range W1 in accordance with operation of the operation part 66 that is used to change the first range W1. The operation part 66 can be configured to change the second range W2. The operation part 66 can include an operation part 66 configured to change the first range W1 and an operation part 66 configured to change the second range W2. The operation part 66 can include an operation part 66 configured to increase the first range W1 and an operation part 66 configured to decrease the first range W1. The operation part 66 can include an operation part 66 configured to increase the second range W2, and an operation part 66 configured to decrease the second range W2. In a case where a single operation part 66 is configured to change both the first range W1 and the second range W2, the operation part 66 can be configured to increase one of the first range W1 and the second range W2 and decrease the other of the first range W1 and the second range W2 in a case where the operation part 66 is operated. The operation part 66 can be configured to change at least one of the first range W1 and the second range W2 by changing the predetermined range W. The electronic controller 52 can be configured to select one predetermined range W from a plurality of predetermined ranges W stored in the storage 54 in accordance with a predetermined order in a case where the operation part 66 is operated.

A process for changing at least one of the first range W1 and the second range W2 with the operation part 66 will now be described with reference to FIG. 9. When electric power is supplied from the battery 34 to the electronic controller 52, the electronic controller 52 starts the process and proceeds to step S81 of the flowchart shown in FIG. 9. As long as electric power is supplied, the electronic controller 52 executes the process from step S81 in predetermined cycles.

In step S81, the electronic controller 52 determines whether or not the operation part 66 has been operated. In a case where it is determined that the operation part 66 has been operated, the electronic controller 52 proceeds to step S82. In step S82, the electronic controller 52 changes the first range W1 and then proceeds to step S83. For example, in a case where an operation for increasing the first range W1 is performed on the operation part 66, the electronic controller 52 increases the first range W1. For example, in a case where an operation for decreasing the first range W1 is performed on the operation part 66, the electronic controller 52 decreases the first range W1. In step S83, the electronic controller 52 changes the second range W2, and ends the process. For example, in a case where an operation for increasing the second range W2 is performed on the operation part 66, the electronic controller 52 increases the second range W2. For example, in a case where an operation for decreasing the second range W2 is performed on the operation part 66, the electronic controller 52 decreases the second range W2.

Modifications

The description related with the above embodiment exemplifies, without any intention to limit, an applicable form of a human-powered vehicle control device according to the present disclosure. In addition to the embodiment described above, the human-powered vehicle control device according to the present disclosure is applicable to, for example, modifications of the above embodiment that are described below and combinations of at least two of the modifications that do not contradict each other. In the modifications described hereafter, same reference numerals are given to those components that are the same as the corresponding components of the above embodiment. Such components will not be described in detail.

Figure 10:
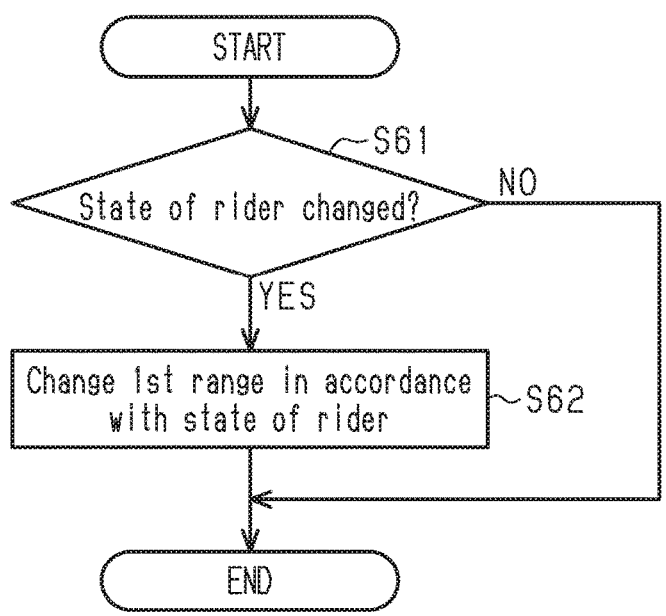
FIG. 10 is a flowchart of a process for changing a predetermined range in accordance with a state of a rider according to a first modification.
Figure 11:
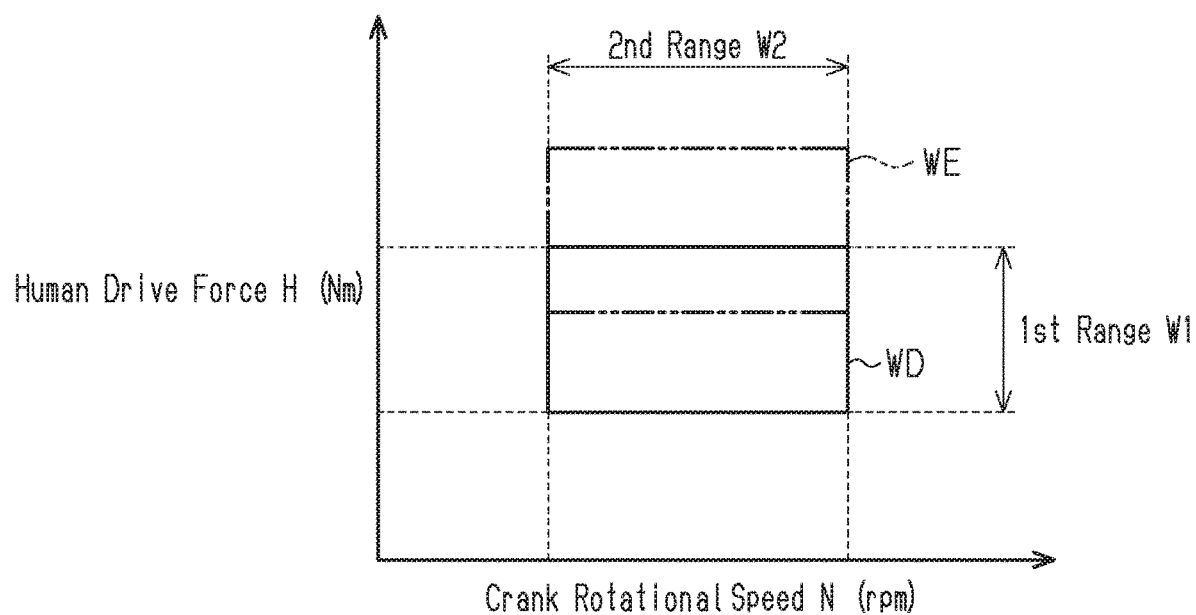
FIG. 11 is a map of a first range and a second range stored in a storage according to a second modification.

In the processing of FIG. 6, the electronic controller 52 can be configured to change only the first range W1 in accordance with the state of the rider. For example, as shown in FIG. 10, step S63 can be omitted from the processing of FIG. 6. In this case, a predetermined range can be switched between predetermined range WD indicated by solid lines in FIG. 11 and the predetermined range WE indicated by double-dashed lines in FIG. 11 in accordance with the state of the rider.

In the processing of FIG. 6, the electronic controller 52 can be configured to change only the second range W2 in accordance with the state of the rider. For example, step S62 can be omitted from the processing of FIG. 6.

Figure 12:
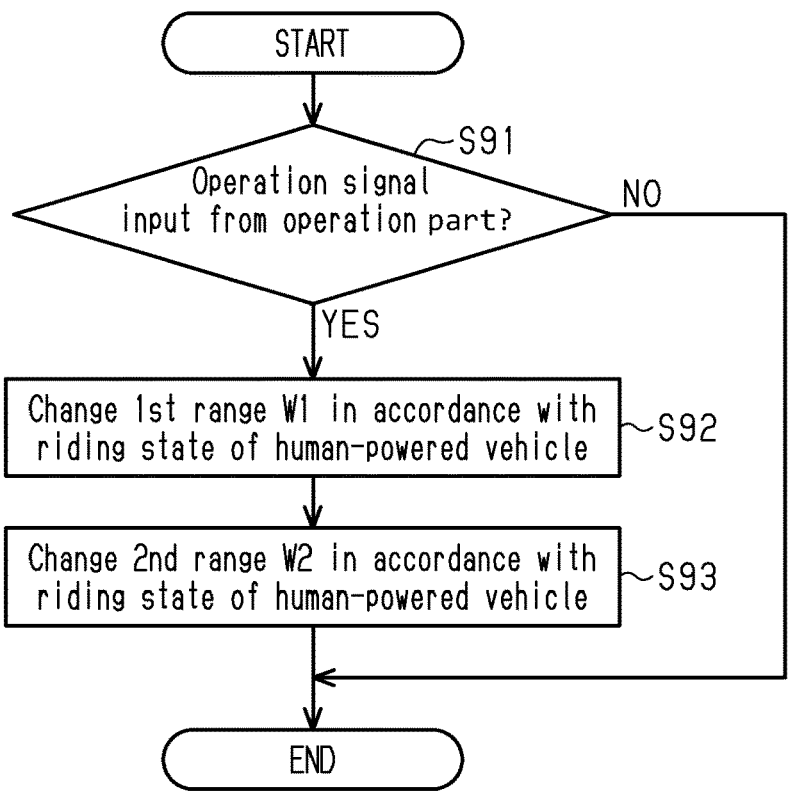
FIG. 12 is a flowchart of processing for changing a predetermined range in accordance with a running state of a human-powered vehicle executed by an electronic controller according to a third modification.

In a case where the operation part 66 has been operated, the electronic controller 52 can be configured to change at least one of the first range W1 and the second range W2 in accordance with the running state of the human-powered vehicle 10. For example, the electronic controller 52 performs the processing shown in FIG. 12. In step S91, the electronic controller 52 determines whether or not an operation signal has been input from the operation part 66 in correspondence with operation of the operation part 66. In a case where it is determined that the operation part 66 has not been operated, the electronic controller 52 ends the process. In a case where it is determined that the operation part 66 has been operated, the electronic controller 52 proceeds to step S92. In step S92, the electronic controller 52 changes the first range W1 in accordance with the running state of the human-powered vehicle 10 and then proceeds to step S93. The electronic controller 52 changes the first range W1 by selecting the first range W1 corresponding to the current running state of the human-powered vehicle 10 from the first ranges W1 stored in the storage 54. In step S93, the electronic controller 52 changes the second range W2 in accordance with the running state of the human-powered vehicle 10 and then ends the process. The electronic controller 52 changes the second range W2 by selecting the second range W2 corresponding to the current running state of the human-powered vehicle 10 from the second ranges W2 stored in the storage 54. The electronic controller 52 can change the first range W1 and the second range W2 by selecting the predetermined range W corresponding to the running state of the human-powered vehicle 10 from the predetermined ranges W stored in the storage 54. In this case, the processes of step S92 and step S93 are performed in a single process.

Figure 13:
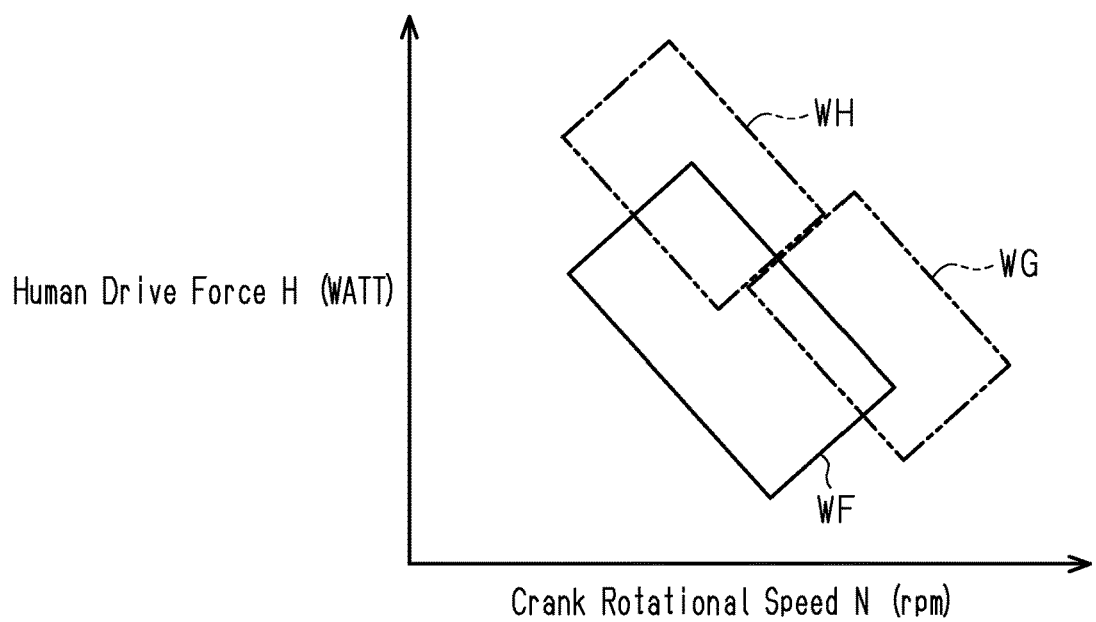
FIG. 13 is a map of a first range and a second range stored in a storage according to a fourth modification.

The second ratio A can be the ratio of the power (Watt) of the assist force generated by the motor 40 to the power (Watt) of the human drive force H input to the human-powered vehicle 10. The power of the human drive force H is calculated by multiplying the human drive force H and the rotational speed N of the crank 12. In this case, the map of the predetermined range W can be as shown in FIG. 13. For example, in a case where the posture of the rider changes from seated pedaling to standing pedaling, the electronic controller 52 changes the predetermined range W from a predetermined range WF indicated by solid lines in FIG. 13 to a predetermined range WG indicated by double-dashed lines in FIG. 13. For example, in a case where the posture of the rider changes from seated pedaling to standing pedaling, the predetermined range W is changed from the predetermined range WG to a predetermined range WH. For example, in a case where the rotational speed N of the crank 12 changes from a value higher than the predetermined value to a lower value, the electronic controller 52 changes the predetermined range W from the predetermined range WF indicated by solid lines in FIG. 13 to the predetermined range WH indicated by double-dashed lines in FIG. 13. For example, in a case where the rotational speed N of the crank 12 changes from a value lower than the predetermined value to a higher value, the predetermined range W is changed from the predetermined range WH to the predetermined range WF.

Figure 14:
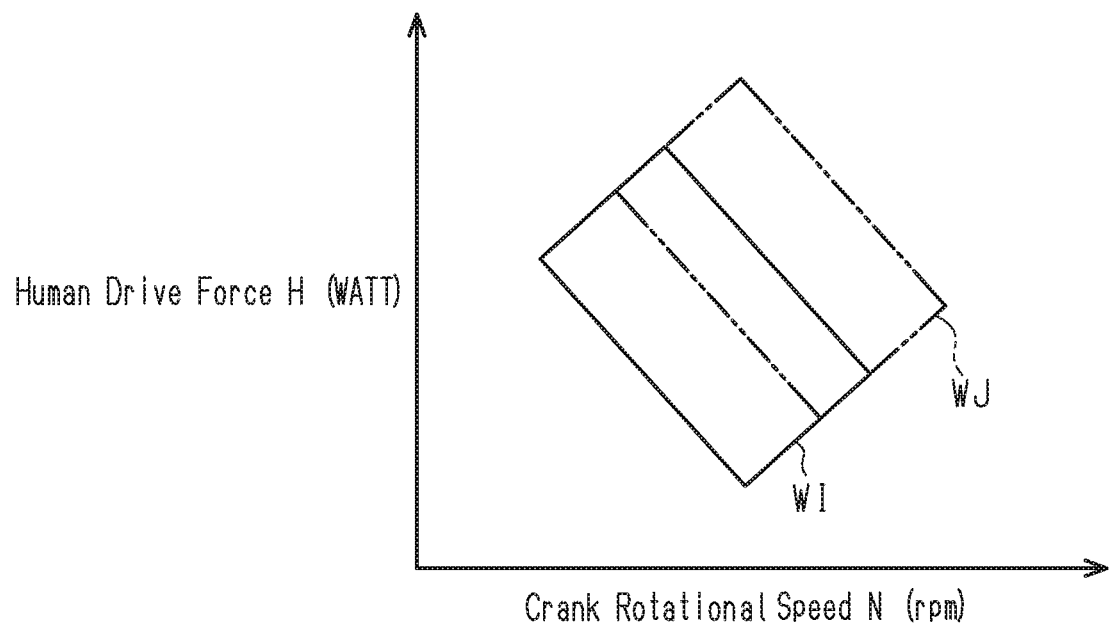
FIG. 14 is a map of a first range and a second range stored in a storage according to the fifth modification.

In a case where the second ratio A is the ratio of the power of the output of the motor 40 to the power of the human drive force H input to the human-powered vehicle 10, the predetermined range can be switched between a predetermined range WI indicated by solid lines in FIG. 14 and a predetermined range WJ indicated by double-dashed lines in FIG. 14 in accordance with the state of the rider in a case where only the first range W1 is changed in accordance with the state of the rider in the processing of FIG. 6.

Figure 9:
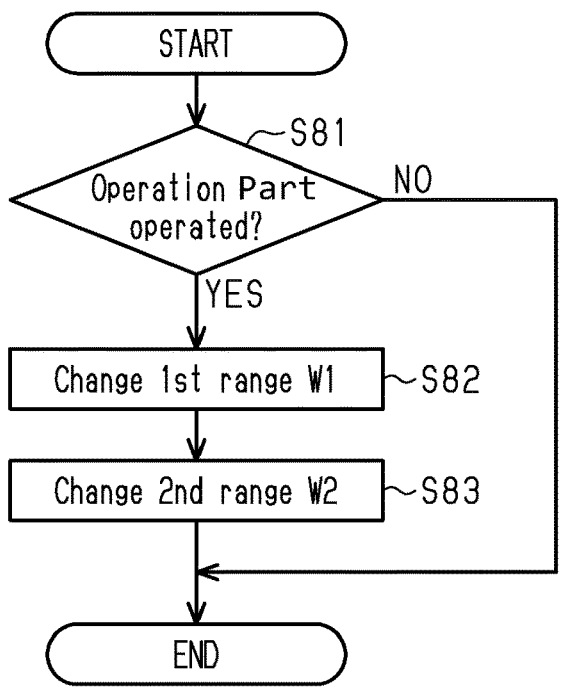
FIG. 9 is a flowchart of a process for changing a predetermined range by an operation of an operation part executed by the electronic controller of FIG. 2.
Figure 15:
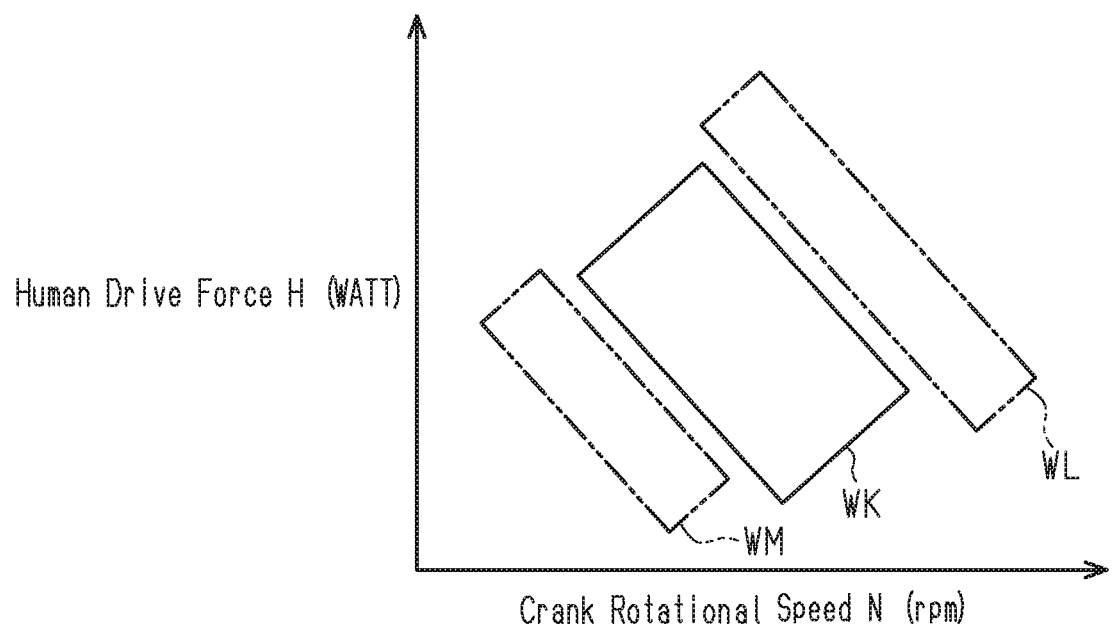
FIG. 15 is a map of a first range and a second range stored in a storage according to a sixth modification.

In the predetermined range W changed in the processing of FIGS. 6 and 9 and its modifications, portions that overlap before and after the change can be omitted. For example, in a case where the second ratio A is the ratio of the power of the output of the motor 40 to the power of the human drive force H input to the human-powered vehicle 10, the predetermined range W can be set as shown in FIG. 15. For example, in a case where the posture of the rider changes from seated pedaling to standing pedaling, the electronic controller 52 changes the predetermined range W from a predetermined range WK indicated by solid lines in FIG. 15 to a predetermined range WL indicated by double-dashed lines in FIG. 15. For example, in a case where the posture of the rider changes from seated pedaling to standing pedaling, the predetermined range W is changed from the predetermined range WL to the predetermined range WK. For example, in a case where the rotational speed N of the crank 12 changes from a value higher than the predetermined value to a lower value, the electronic controller 52 changes the predetermined range W from the predetermined range WK indicated by solid lines in FIG. 15 to a predetermined range WM indicated by double-dashed lines in FIG. 15. For example, in a case where the rotational speed N of the crank 12 changes from a value lower than the predetermined value to a higher value, the predetermined range W is changed from the predetermined range WM to the predetermined range WK.

The storage 54 can be configured to change at least one of the predetermined range W, the first range W1, and the second range W2 that are stored in the storage 54. In this case, for example, the electronic controller 52 changes at least one of the predetermined range W, the first range W1, and the second range W2 in accordance with the input signal from at least one of the operation device provided on the human-powered vehicle 10 and the external device. For example, when the state of the rider and information such as the physical information are input to at least one of the operation device provided on the human-powered vehicle 10 and the external device, the electronic controller 52 changes at least one of the predetermined range W, the first range W1, and the second range W2 stored in the storage 54 in accordance with the input information.

In the processing of FIGS. 6 and 9 and its modifications, the electronic controller 52 can change the range included in the predetermined range W in accordance with at least one of the state of the rider and the running state of the human-powered vehicle 10 instead of changing the predetermined range W by selecting one of the plurality of predetermined ranges W stored in the storage 54. In the processing of FIGS. 6 and 9 and its modifications, the electronic controller 52 can change the range included in the first range W1 in accordance with at least one of the state of the rider and the running state of the human-powered vehicle 10 instead of changing the first range W1 by selecting one of the plurality of first ranges W1 stored in the storage 54. In the processing of FIGS. 6 and 9 and its modifications, the electronic controller 52 can change the range included in the second range W2 in accordance with at least one of the state of the rider and the running state of the human-powered vehicle 10 instead of changing the second range W2 by selecting one of the plurality of second ranges W2 stored in the storage 54.

The electronic controller 52 can change only one of the first ratio R and the second ratio A in the first control state. In a case where only the first ratio R is changed in the first control state, the motor 40 can be omitted from the human-powered vehicle 10. In a case where only the second ratio A is changed in the first control state, the transmission 36 can be omitted from the human-powered vehicle 10. Alternatively, the transmission 36 can be a transmission operated by a wire.

In a case where the rotational speed N of the crank 12 is higher than the second range W2, the electronic controller 52 can be configured to control the electric component 32 so as to decrease the first ratio R. In a case where the rotational speed of the crank 12 is lower than the second range W2, the electronic controller 52 can be configured to control the electric component 32 so as to increase the first ratio R.

In a case where the rotational speed N of the crank 12 is higher than the second range W2, the electronic controller 52 can be configured to control the electric component 32 so as to decrease the second ratio A. In a case where the rotational speed N of the crank 12 is lower than the second range W2, the electronic controller 52 can be configured to control the electric component 32 so as to increase the second ratio A.

In a case where the human drive force H is higher than the first range W1, the electronic controller 52 can be configured to control the electric component 32 so as to increase the first ratio R. In a case where the human drive force H is lower than the first range W1, the electronic controller 52 can be configured to control the electric component 32 so as to decrease the first ratio R.

In a case where the human drive force H is higher than the first range W1, the electronic controller 52 can be configured to control the electric component 32 so as to decrease the second ratio A. In a case where the human drive force H is lower than the first range W1, the electronic controller 52 can be configured to control the electric component 32 so as to increase the second ratio A.

Figure 4:
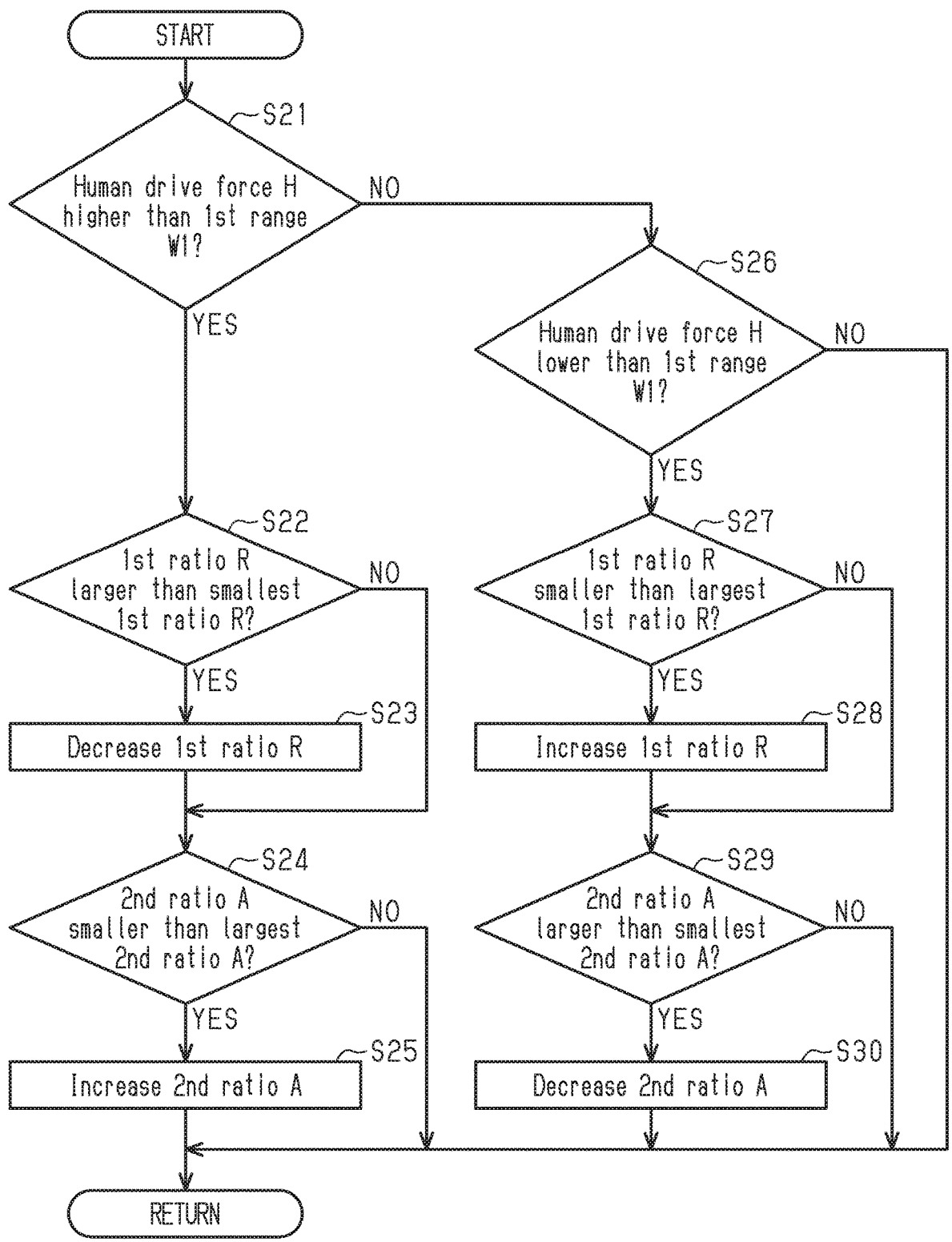
FIG. 4 is a flowchart of a subroutine of a first process in FIG. 3.
Figure 5:
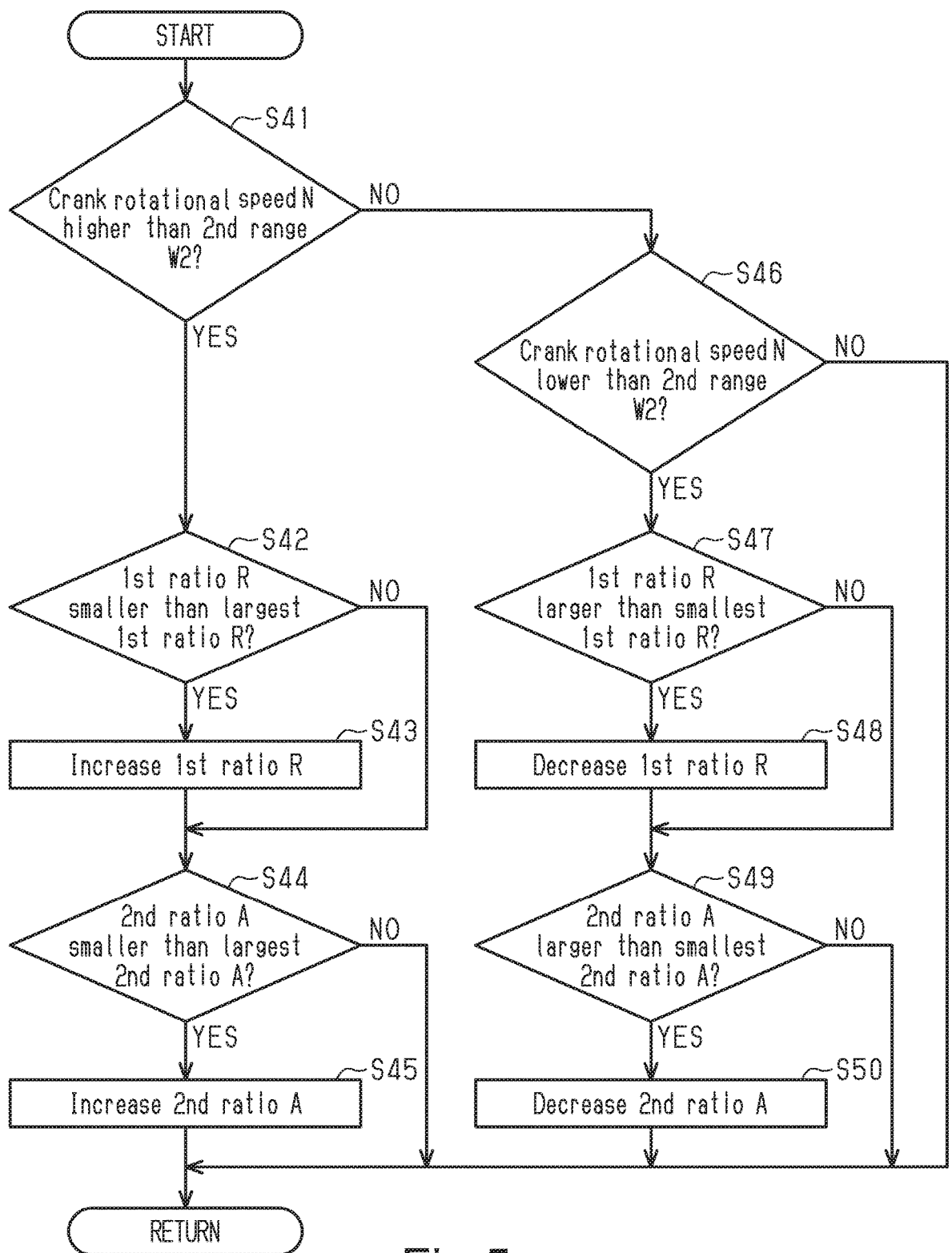
FIG. 5 is a flowchart of a subroutine of a second process in FIG. 3.

Some processing groups can be omitted from the flowcharts of FIGS. 4 and 5. For example, in the flowchart of FIG. 4, steps S22, S23, S27, and S28 form a first processing group. Further, steps S24, S25, S29, and S30 can form a second processing group. In the flowchart of FIG. 5, steps S42, S43, S47, and S48 form a third processing group. Further, steps S44, S45, S49, and S50 form a fourth processing group. In this case, in each embodiment and its modifications, one of the first processing group and the second processing group can be omitted, and one of the third processing group and the fourth processing group can be omitted.

The electronic controller 52 can be configured not to operate in the second control state. The order of steps S22, S23 and steps S24, S25 in the flowchart of FIG. 4 can be changed. The order of steps S27, S28 and steps S29, S30 in the flowchart of FIG. 4 can be changed. The order of steps S42, S43 and steps S44, S45 in the flowchart of FIG. 5 can be changed. The order of steps S47, S48 and steps S49, S50 in the flowchart of FIG. 4 can be changed.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three.

What is claimed is:

1. A human-powered vehicle control device comprising:
an electronic controller configured to control an electric component of a human-powered vehicle including a crank and a drive wheel;
a first detector configured to directly detect a state of a rider; and
a second detector configured to directly detect a running state of the human-powered vehicle,
the electronic controller being configured to: control the electric component, determine whether a human drive force input to the crank is outside a first range for the human drive force, and, upon determining that the human drive force input to the crank shifts from the first range for the human drive force to outside the first range for the human drive force, change at least one of a first ratio, of a rotational speed of the drive wheel to a rotational speed of the crank, and a second ratio, of a drive force assisting propulsion of the human-powered vehicle to the human drive force, the electronic controller being configured to determine whether at least one of the state of the rider detected by the first detector and the running state of the human-powered vehicle detected by the second detector has changed, the electronic controller being configured to change the first range for the human drive force by selecting one of a plurality of stored predetermined ranges for the human drive force that at least partially differ from one another as the first range in response to determining that at least one of the state of the rider detected by the first detector and the running state of the human-powered vehicle detected by the second detector has changed, the state of the rider directly detected by the first detector including at least one of a detected posture of the rider and detected biological information of the rider, and the running state of the human-powered vehicle directly detected by the second detector including at least one of a detected inclination of the human-powered vehicle, a detected gradient of a road surface on which the human-powered vehicle travels, and a detected condition of a road surface on which the human-powered vehicle travels.

2. The human-powered vehicle control device according to claim 1, wherein
the electronic controller is configured to control the electric component so as to change at least one of the first ratio and the second ratio upon determining the rotational speed of the crank shifts from a second range to outside the second range.

3. The human-powered vehicle control device according to claim 1 wherein
the electronic controller is configured to switch between a first control state, in which the electronic controller controls the electric component so as to change at least one of the first ratio and the second ratio upon determining the human drive force shifts from the first range for the human drive force to outside the first range for the human drive force, and a second control state, in which the electronic controller does not change the first ratio and the second ratio even if the human drive force shifts from the first range for the human drive force to outside the first range for the human drive force, and
the electronic controller is configured to switch between the first control state and the second control state in accordance with at least one of the state of the rider and the running state of the human-powered vehicle.

4. The human-powered vehicle control device according to claim 2, wherein
the electronic controller is configured to switch between a first control state, in which the electronic controller controls the electric component so as to change at least one of the first ratio and the second ratio upon determining the human drive force shifts from the first range for the human drive force to outside the first range for the human drive force, and a second control state, in which the electronic controller does not change the first ratio and the second ratio even if the human drive force shifts from the first range for the human drive force to outside the first range for the human drive force,
the electronic controller is configured to switch between the first control state and the second control state in accordance with at least one of the state of the rider and the running state of the human-powered vehicle,
the electronic controller is configured to control the electric component so as to change at least one of the first ratio and the second ratio upon determining the rotational speed of the crank shifts outside the second range and while in the first control state, and
the electronic controller is configured not to change the first ratio and the second ratio even when the rotational speed of the crank shifts outside the second range and while in the second control state.

5. The human-powered vehicle control device according to claim 2, wherein
the electronic controller is configured to control the electric component so as to increase the first ratio upon determining the rotational speed of the crank is higher than the second range.

6. The human-powered vehicle control device according to claim 2, wherein
the electronic controller is configured to control the electric component so as to decrease the first ratio upon determining the rotational speed of the crank is lower than the second range.

7. The human-powered vehicle control device according to claim 2, wherein
the electronic controller is configured to control the electric component so as to increase the second ratio upon determining the rotational speed of the crank is higher than the second range.

8. The human-powered vehicle control device according to claim 2, wherein
the electronic controller is configured to control the electric component so as to decrease the second ratio upon determining the rotational speed of the crank is lower than the second range.

9. A human-powered vehicle control device comprising:
an electronic controller configured to control an electric component of a human-powered vehicle including a crank and a drive wheel;
a first detector configured to directly detect a state of a rider; and
a second detector configured to directly detect a running state of the human-powered vehicle,
the electronic controller being configured to switch between a first control state and a second control state, the first control state being a state in which the electronic controller controls the electric component, determines whether a human drive force input to the crank is outside a first range, and, upon determining that the human drive three input to the crank shifts from the first range to outside the first range, changes at least one of a first ratio, of a rotational speed of the drive wheel to a rotational speed of the crank, and a second ratio, of a drive force assisting propulsion of the human-powered vehicle to the human drive force, and the second control state being a state in which the electronic controller does not change the first ratio and the second ratio even if it is determined that the human drive force shifts from the first range to outside the first range,
the electronic controller being configured to switch between the first control state and the second control state based on at least one of the state of the rider directly detected by the first detector and the running state of the human-powered vehicle detected by the second detector,
the state of the rider directly detected by the first detector including at least one of a detected posture of the rider and detected biological information of the rider, and
the running state of the human-powered vehicle directly detected by the second detector including at least one of a detected inclination of the human-powered vehicle, a detected gradient of a road surface on which the human-powered vehicle travels, and a detected condition of a road surface on which the human-powered vehicle travels.

10. The human-powered vehicle control device according to claim 1, wherein
the electronic controller is configured to control the electric component so as to decrease the first ratio upon determining the human drive force is higher than the first range for the human drive force.

11. The human-powered vehicle control device according to claim 1, wherein
the electronic controller is configured to control the electric component so as to increase the first ratio upon determining the human drive force is lower than the first range for the human drive force.

12. The human-powered vehicle control device according to claim 1, wherein
the electronic controller is configured to control the electric component so as to increase the second ratio upon determining the human drive force is higher than the first range for the human drive force.

13. The human-powered vehicle control device according to any claim 1, wherein
the electronic controller is configured to control the electric component so as to decrease the second ratio upon determining the human drive force is lower than the first range for the human drive force.

14. The human-powered vehicle control device according to claim 1, further comprising
an operation part for changing the first range for the human drive force, the operation part comprising an operation member, a sensor that detects movement of the operation member, and an electric circuit that communicates with the electronic controller in accordance with an output signal of the sensor,
the operation member being selected from the group consisting of a push switch, a lever type switch, and a touch panel.

15. The human-powered vehicle control device according to claim 1, further comprising
a storage having the first range for the human drive force stored therein.

16. The human-powered vehicle control device according to claim 1, wherein
the electric component includes a transmission configured to change the first ratio.

17. The human-powered vehicle control device according to claim 1, wherein
the electric component includes a motor assisting propulsion of the human-powered vehicle.

18. The human-powered vehicle control device according to claim 1, wherein
the first detector is configured to directly detect biological information of the rider.

19. The human-powered vehicle control device according to claim 9, wherein
the first detector is configured to directly detect biological information of the rider.

20. The human-powered vehicle control device according to claim 9, wherein
the controller is configured to determine whether a first switching condition has been satisfied and switch from the second control state to the first control state when it is determined that the first switching condition is satisfied, and
the controller is configured to determine whether a second switching condition has been satisfied and switch from the first control state to the second control state when it is determined that the second condition is satisfied.

* * * * *